(12) United States Patent
Sharp

(10) Patent No.: US 6,252,689 B1
(45) Date of Patent: Jun. 26, 2001

(54) NETWORKED PHOTONIC SIGNAL DISTRIBUTION SYSTEM

(75) Inventor: Gordon P. Sharp, Newton, MA (US)

(73) Assignee: Aircuity, Inc., Newtown, MA (US)

( * ) Notice: Subject to any disclaimer, the term of this patent is extended or adjusted under 35 U.S.C. 154(b) by 0 days.

(21) Appl. No.: 09/058,468

(22) Filed: Apr. 10, 1998

(51) Int. Cl.[7] ............................. H04J 14/02; H04B 10/12
(52) U.S. Cl. ..................... 359/168; 359/126; 359/143; 359/145; 359/147
(58) Field of Search .................. 359/126–128, 359/143–145, 147, 168–170

(56) References Cited

U.S. PATENT DOCUMENTS

| | | | | |
|---|---|---|---|---|
| 4,346,478 | * | 8/1982 | Sichling | 359/165 |
| 4,390,974 | * | 6/1983 | Siems | 367/76 |
| 4,434,510 | * | 2/1984 | Lemelson | 359/168 |
| 4,459,591 | * | 7/1984 | Haubner et al. | 340/825.57 |
| 4,506,153 | * | 3/1985 | Ohno | 250/227.23 |
| 4,517,456 | * | 5/1985 | Halsall et al. | 250/226 |
| 4,525,873 | * | 6/1985 | Baues | 359/168 |
| 4,543,961 | * | 10/1985 | Brown . | |
| 4,736,590 | | 4/1988 | Monticelli, Jr. | 60/64.1 |
| 4,775,971 | * | 10/1988 | Bergmann | 359/168 |
| 4,820,916 | * | 4/1989 | Patriquin | 250/208.2 |
| 4,864,489 | | 9/1989 | Yasuhara et al. | 364/131 |
| 4,942,294 | | 7/1990 | Witte | 250/227.14 |
| 5,258,868 | * | 11/1993 | Jensen et al. | 359/168 |
| 5,796,504 | * | 8/1998 | Sonderegger et al. | 359/144 |

FOREIGN PATENT DOCUMENTS

| | | |
|---|---|---|
| 0 338 185 | 10/1989 | (EP) . |
| 0 439 887 | 8/1991 | (EP) . |
| 2 262 676 | 6/1993 | (GB) . |
| WO 91/03103 | 3/1991 | (WO) . |
| WO 92/18886 | 10/1992 | (WO) . |
| WO 93/25020 | 12/1993 | (WO) . |
| WO 97/50109 | 12/1997 | (WO) . |

OTHER PUBLICATIONS

Uenoya T., "Operation, Administration and Maintenance Systems of the Optical Fiber Loop", *Communications: Connecting The Future,* Dec. 2–5, 1990, vol. 3, Dec. 2, 1990, pp. 1493–1497.

* cited by examiner

*Primary Examiner*—Leslie Pascal
(74) *Attorney, Agent, or Firm*—Drinker Biddle & Reath LLP

(57) ABSTRACT

The present invention is a networked photonic signal distribution system. The system includes a source of light, a light detector, and an optical distribution network for distributing light from the source to the detector along a preselected optical path. The system includes a first plurality of remotely distributed optical devices that are in optical communication with the optical distribution network. The optical devices are responsive to at least one external condition such as a gas, biological agents, particles, humidity, temperature, air velocity, pressure, displacement, and proximity or location of objects including people which can affect a parameter of the available light in the optical device. The invention further includes a second plurality of remotely distributed switches for selectably connecting the optical devices to the optical distribution network. The second plurality of remotely distributed switches receive the light from the source of light and convey light that is affected by the external condition to the optical distribution network and to the detector. The detector generates output signals in response to the affected light. The output signals are received by a processor responsive to signals and generates outputs such as audio or video indications that are representative of at least one detected external condition.

60 Claims, 16 Drawing Sheets

NETWORKED PHOTONIC SIGNAL DISTRIBUTION SYSTEM

FIELD OF THE INVENTION

The present invention relates generally to a signal distribution system, and more particularly to a networked photonic signal distribution system for sensing an ambient condition affecting a parameter of light.

BACKGROUND OF THE INVENTION

It is of great importance to our health and safety to know the condition and habitability of our environment. In particular, much effort and expense has been expended in the past to control and detect pollutants in air. For example, in residential housing units including homes, office buildings, or buildings that have laboratories or where dangerous chemicals are stored, the need to monitor the air for smoke or contamination is very great. It is also necessary that air sensing be accurate and rapid which is a particular challenge in multiple spaces such as individual rooms in large office or apartment buildings.

Early attempts to address this need have produced systems capable of detecting poor ventilation in buildings by simple means, usually indicating excess $CO_2$ levels or VOC's (Volatile Organic Compounds), excess particulates, or other dangerous gaseous materials. However, these early continuous monitoring systems were often expensive, difficult to install, and not known to be accurate or reliable due to the nature of the individual sensors themselves or the calibration required of these sensors.

Systems for sensing air quality are shown in U.S. Pat. Nos. 3,683,352; 3,781,092; 3,805,066; 4,027,153; 4,403,806; 4,516,858; 4,641,025; and 4,820,916, United Kingdom patent application GB 2,215,038, and German Patent DE 3409-618-A1.

U.S. Pat. No. 3,683,352 discloses an alarm system for sensing smoke and intruders. The '352 patent teaches the use of a single light beam source for transmitting light through remote light-to-electric transducers for detecting smoke and intruders passing through the light beams between the transducers. Detection of an intruder or smoke is indicated by an amplitude or polarization modulation of the light signal at a characteristic frequency.

U.S. Pat. No. 3,781,092 discloses a monitoring system having a plurality of independent optical fiber paths, transducers, optical shutters, and modulators in combination with a common laser light source. Light is emitted by the common source and split among the various fiber light paths present in the system. The light travels through the fiber light path to the transducer which encodes information onto the light by means of an optical switch.

U.S. Pat. No. 3,805,066 discloses a smoke detecting device using a plurality of optical fibers arranged in a series alignment leaving gaps therebetween. A light signal is transmitted through the fiber for detection of smoke by a photo-electric transducer located at the terminal end of the series alignment.

U.S. Pat. No. 4,027,153 discloses a fiber network having a passive optical coupler for the transmission of data between addressable subscriber stations present in the system. Each station has a transmitter and receiver and a specific address code for identification. Information from the stations is sampled cyclically by a common addressing unit also connected to the stations via the passive optical coupler.

U.S. Pat. No. 4,403,806, discloses a visibility measurement apparatus having a central unit for controlling an emitted light signal and a plurality of transmitter and receiver units for measuring the attenuation of the emitted light signal. The centralized unit emits the light signal which is transmitted and received by the transmitter and receiver units and returned to the central unit for evaluation.

U.S. Pat. No. 4,516,858 discloses a multiple site laser-excited pollution monitoring system having a central laser source and a plurality of optical fibers. The laser emits a light signal that is deflected in timed sequence to a plurality of remote laser-excited photo-acoustic detector heads for detecting vapor by Raman scattering, fluorescence, absorption, and photoionization. The detector heads transmit a detection signal by electric wires to a signal processor and display unit that are also located at a central location.

U.S. Pat. No. 4,641,025 discloses a system for determining the position of the boundary between substances having different refractive indices. The '025 patent discloses a plurality of optical sensors, a common pulse source, and an interface responsive to the source pulse and for producing a response pulse that is delivered to common receiver. The receiver measures the duration of the response pulse having a time duration that is proportional to the number of sensors in the system. The position of the boundary is determined by calculating the time duration in response to a fixed and known number of sensors.

U.S. Pat. No. 4,820,916 discloses an optically powered sensor system having a plurality of sensors connected to an optical bus for communication with a system controller. Optical energy is transmitted on the bus and distributed to the sensors system-wide. The sensors have a photodiode array for sensing a measurable parameter and providing an optical pulse signal as a function of the measured parameter. The sensors include a transducer and a pulse encoder for producing a series of short duration pulses to drive an optical source for transmitting corresponding optical pulses to the system controller. The patent provides for a multi-sensor configuration by providing sensor-specific time delay prior to the transmission of the return pulse from the sensor to the controller. The time delay provides a predetermined time window for each sensor allowing sensor discrimination.

United Kingdom patent application GB 2,215,038 discloses an optical sensing system including a central light source emitting broadband light over a plurality of light paths that are terminated in a common Fabry-Perot cavity filter having scanning and detector means for scanning a narrow bandwidth of the broadband light.

German Patent DE 3409-618-A1 discloses a fiber optic measurement system having a plurality of optical fibers connected to a plurality of optical sensors and light sources having different emission spectra selected according to the desired absorption and transmission characteristics of the sensors.

In addition to installed systems, other approaches for sensing the air quality in the past have included hand-held sensing instruments. However, these are expensive and awkward devices to use, particularly when long term multi-room monitoring is desired. Another approach used in the past is individual OEM type sensor instruments connected into some type of data gathering and or control system. However, these systems are also very costly if many rooms must be monitored simultaneously, since costly sensors are required in each room that is monitored. In addition, cost and complexity dramatically increase when more than one gas is to be sensed and monitored. Furthermore, operating costs of these systems are also high due to the large amount of field work required to continually recalibrate the large volume of sensors that are employed.

Recently, many types of new sensors have been developed or proposed that use optical techniques with light from lasers or other light sources. In many cases the light emitted from these sources can be transported and guided by the use of fiber optic cable made of plastic, glass or other compounds. This allows the emitter and/or detector to be remotely located from the area to be sensed. It also potentially allows the use of techniques to multiplex the use of one set of gas or particle light emitters and detectors over many measurement sites or locations. Current multiplexing approaches have included, for example, Wavelength Division Multiplexing where many distinct light signals each of a different wavelength are created and sent in to a fiber system with multiple sensors. Each sensor can respond to a different wavelength signal. These modified signals are then demultiplexed at the common detector location and individually sensed.

In another example, Time Division Multiplexing (TDM) is used to send a very short light pulse into a multiple fiber (1XN) beam splitter or coupler which creates multiple copies of the pulse on multiple fibers connected to the coupler. After passing through a sensor located on each one of these multiple fibers, all the modified pulses are recombined by another multiple fiber (1XN) coupler back onto one return fiber. As long as the path lengths of the multiple fiber-sensor paths are different, the result will be a pulse train of individually modified pulses on the single return fiber. By using time and path length the affected pulses can be matched to the appropriate sensor to detect and determine a particular condition or substance at the sensor's location.

These two multiplexing approaches are complex, expensive, and are not general purpose due to the wavelength or time limitations of the technique. Consequently they are not readily adapted to changing environmental sensing requirements in a building.

To avoid these types of limitations and complexity other systems have been developed that use optical switches to switch one of many fibers coming from a remote location to a common emitter or detector. These approaches use an optical switch which can switch a light beam from one fiber to another one of several other fibers with minimal loss and affect on the transmitted light. These approaches specifically locate the multiplexing switch near the emitter and or detector and use a multitude of fiber cables leading from the central location to the sensed locations. This approach although simpler and more flexible than the previous approaches suffers from the need to locate a vast amount of fiber cables throughout the building. If a new location is to be added it requires the installation of another fiber cable between the central location and the new sensed location.

The present invention addresses and solves many of the above-mentioned problems associated with prior art systems.

SUMMARY OF THE INVENTION

The present invention is a networked photonic signal distribution system. The system employs commercially available and economical optical switches, optical fiber, and a common emitter and detector. Remotely distributed optical switches are used to switch a light beam from one fiber to another with minimal loss at a sensed location to effect a difference in the light beam which is used to determine a particular condition or substance. This system is particularly useful for detecting a plurality of pre-selected conditions or substances in an area such as the ambient space about a test chamber in a laboratory, the rooms in a building, an entire building or several buildings instantaneously. It is understood that the invention can be used for homes, including multiple residential dwelling units, office buildings and the like. The invention can also be used to control an industrial or manufacturing process.

This system can greatly reduce the complexity and cost of environmental control and detection systems. First of all it can dramatically reduce the amount of fiber cable required as well as creating a much more flexible system that can be added to easily without running long lengths of cable. Furthermore, the control of the sensing network is totally flexible and programmable. Unlike the above multiplexing approaches that in effect try to sense all sensor locations virtually simultaneously, this new approach is a selective approach where locations are sensed either sequentially in a programmed pattern or are selected in real time. This system is consequently more flexible in its applications. If desired many of the before mentioned time division and wavelength division or frequency multiplexing schemes can still be used with this approach.

Another advantage of this approach is that the optical loss of the switches is much less than the loss of the couplers used in the multiplexer concepts previously described. In TDM or WDM approaches the source light must pass through all the sensors simultaneously, consequently couplers are used to split the beam into each sensor. The power division of this system means that very little light reaches each sensor drastically limiting the number of potential sensing locations that are usable. In the new approach, by contrast the optical switches route all the optical power of the source to the sensed location. The only loss of power is due to the insertion losses of the switches which are in comparison quite small compared to the power division losses of the couplers.

Lastly, the new approach is quite economic by potentially using the control capabilities of a building, critical spaces or laboratory airflow control system's control and data communications network to control the fiber network's optical switches and hubs. This means that this control function comes almost for free since these building control networks will need to be installed in these buildings whether the photonic environmental sensing network is desired or not. The cost of the additional control outputs needed for the photonic network will be a very minor amount of additional cost to these systems.

Rather than use the previously mentioned "single star" method where all fiber emanates from a single location with all switching centralized at the emitter/detector location, the new approach can use a bus, ring or cascaded star using multiple secondary or tertiary hubs to create a lower cost and more flexible approach. All of these new approaches share the characteristic that at least some of the optical switching is done remotely from the central emitter and/or detectors. These remote switches may be self controlled due to some pre-configured algorithm or more likely they can be controlled by a control and data communications network. In the preferred embodiment this control and communication is done through a separate overlaid electronic or perhaps optical control and data communications network with control/data communication nodes located near the optical switches. Alternatively this control and data communication can also be achieved through the photonic signal distribution network using techniques such as wavelength division multiplexing to run the controls signals at a different wavelength from the gas or particle sensing wavelengths.

The networked photonic signal distribution system previously mentioned has a source of light, a light detector, and an optical distribution network for distributing light from the source to the detector along a preselected optical path. The system includes a first plurality of remotely distributed optical devices that are in optical communication with the optical distribution network. The first plurality of remotely distributed optical devices receive light from the optical distribution network. The optical devices are responsive to an external condition such as but not limited to gas or particles which affect a parameter of the available light in the optical device.

The invention includes a second plurality of remotely distributed switches for selectably connecting the optical devices to the optical distribution network. The second plurality of remotely distributed switches receive the light from the source of light and convey light that is affected by the external condition to the optical distribution network and to the detector. The detector generates output signals in response to the affected light. The output signals are received by a processor responsive to signals and which generates outputs such as audio or video indications that are representative of the external condition.

The invention also includes, when required, a separate control network comprised of a fiber or electrical network such as a coaxial cable or a multi-conductor twisted line, in parallel with the photonic signal distribution system network for an alternate means of control of the remotely distributed switches. This control network would typically operate on a data communications basis with appropriate network protocols to pass data to and between the control/data communications devices. This network could be dedicated to the control of the photonic signal distribution system network or could be also used for other functions as well such as environmental controls in the building or for data networking between office Personal Computers or Workstation.

In an alternate embodiment, control of the remotely distributed switches can be accomplished through special encoding of the light signals that are being passed along the photonic signal distribution system network itself. This approach has the advantage of eliminating another separate fiber or electrical twisted pair control path.

In another alternate embodiment, either the common emitter or detector is replaced with either individual emitters or detectors at the sensed locations to eliminate the need for either a supplying or a returning path of photonic signal from the distribution network. Where individual emitters are used at the sensed locations an on/off control for the emitters may (depending on the network architecture) be used to replace all or a portion of the network optical switches.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

DETAILED DESCRIPTION OF THE INVENTION

Figure 1:
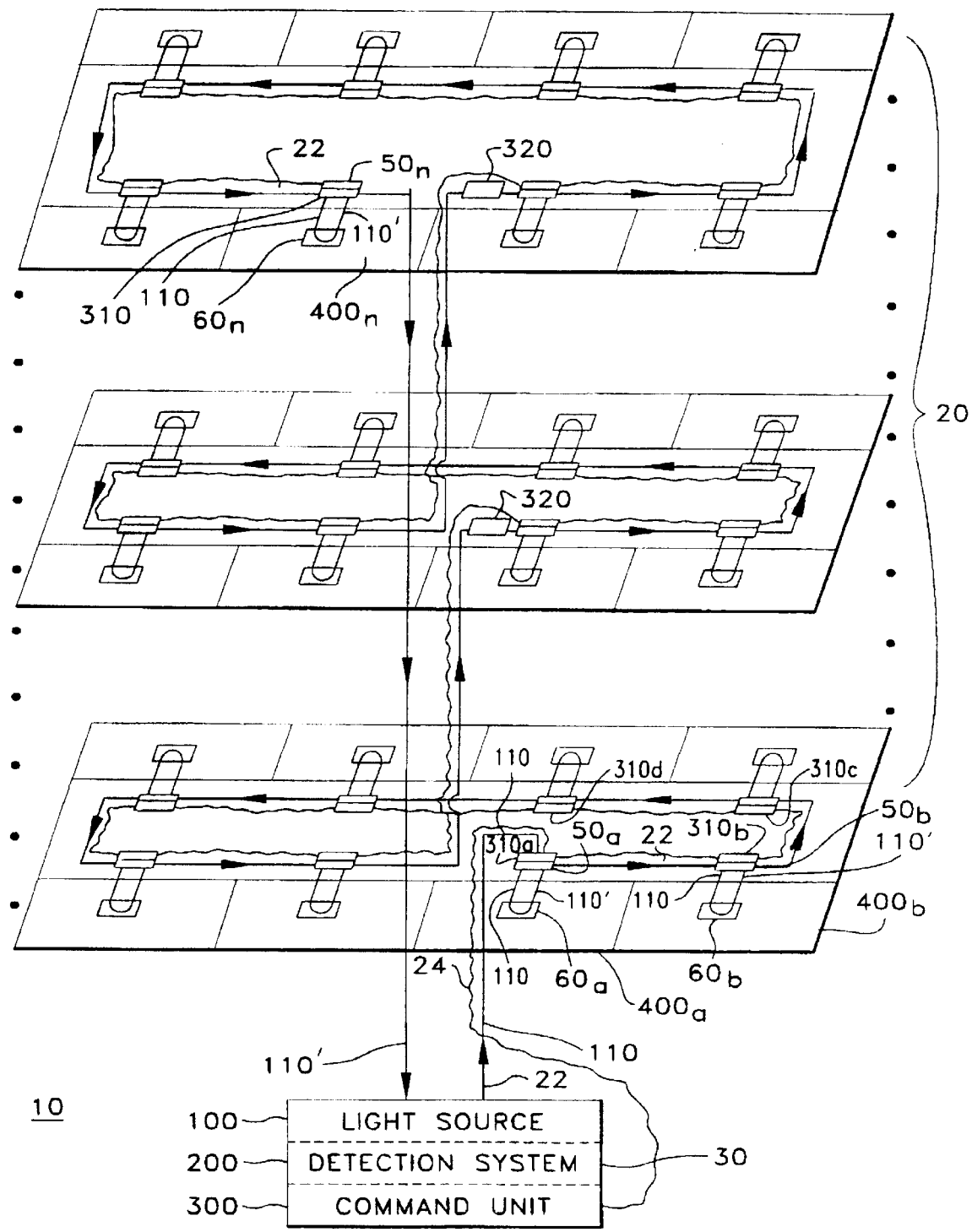
FIG. 1 illustrates a networked photonic signal distribution system according to the present invention having a series network structure.

The present invention is a networked photonic signal distribution system for detecting a plurality of pre-selected conditions or substances in an area such as contaminant control of a fume hood, the ambient space about a test chamber in a laboratory, the rooms in a building, an entire building or several buildings. Referring now to the drawings, wherein like numerals indicate like elements, there is shown in FIG. 1 an illustration of a networked photonic signal distribution system 10 having a photonic signal distribution network 20 and a common light source, detection, and command unit 30.

The photonic signal distribution network 20 includes an optical fiber 22, and a plurality of optical switches 50 and optical devices 60. The common source, detection, and command system 30 includes a light source system 100, a detection system 200, and a network communication and command unit 300. In a preferred embodiment of the networked photonic signal distribution network system 10, the light source 100 is connected to the optical fiber 22 and emits light 110 that is distributed by the distribution network 20 to the plurality of optical switches 50 and optical devices 60. The light 110 is affected 110' by a condition in optical contact with the optical device 60. The affected light 110' is carried by the distribution network 20 where it is detected by the detection system 200. The affected light is then used, or communicated to some other device, by the system 10 to indicate or otherwise communicate a detected condition.

In one aspect of the invention, a first plurality of remotely distributed optical devices 60 are in optical communication with the optical distribution network 20. The optical devices 60 receive the light 110 from the optical distribution network 20 by means of an optical switch 50. Specifically, each individual optical device 60a, 60b, . . . 60n is independently responsive to a proximate external condition 400a, 400b, . . . 400n which affects a parameter of the light 110 to produce individually affected light 110'. The external condition 400a, 400b, . . . 400n may include, but is not limited to $CO_2$ levels or VOC's (Volatile Organic Compounds) other gaseous materials, bacterial agents, temperature, humidity, air velocity, air pressure or particulates.

A second plurality of remotely distributed switches 50 selectably connect the optical devices 60 to the optical distribution network 20. Each remotely distributed switch 50a, 50b, . . . 50n receives the light 110 from the source of light 100. The remotely distributed switches 50a, 50b, . . . 50n also convey the affected light 110' that is affected by the external condition 400a, 400b, . . . 400n to the optical distribution network 20. The optical distribution network 20 conveys the affected light 110' to a light detector in the detection system 200.

In response to the affected light 110', the detection system 200 generates output signals by means of a processor unit 290 shown in FIG. 9 and described in more detail below. This processor 290 generates outputs representative of the external condition 400a, 400b, . . . 400n. These outputs may be in analog signal or digital information format. The digital information may be conveyed to a building or facility management system for use or display to an operator or directly to a computer such as a Personal Computer or workstation for further analysis and/or display to an operator.

In another aspect of the preferred embodiment, each remotely distributed switch 50a, 50b, . . . 50n is connected to and controlled by a data communications and command unit 310a, 310b, 310n. These units may be dedicated solely for this system or may have another use such as in helping to control aspects of the building or be part of Personal Computers or Workstation which are networked together. As shown in FIG. 1 the data units 310a, 310b, . . . 310n will typically be connected to the command unit 300 by means of a separate data communications network 24. The data communications network 24 can be an electrical or a fiber network, and convey electrical or optical preselected data signals that are generated by the command unit 300 to control the remotely distributed switch 50a, 50b, . . . 50n.

Network Structures

In one aspect of the networked photonic signal distribution system 10, the optical distribution network 20 forms a bus or a ring network structure as shown in FIG. 1. The ring network structure includes a plurality of electro-optical switches 50 and devices 60 connected in series along the optical fiber 22.

Figure 5:
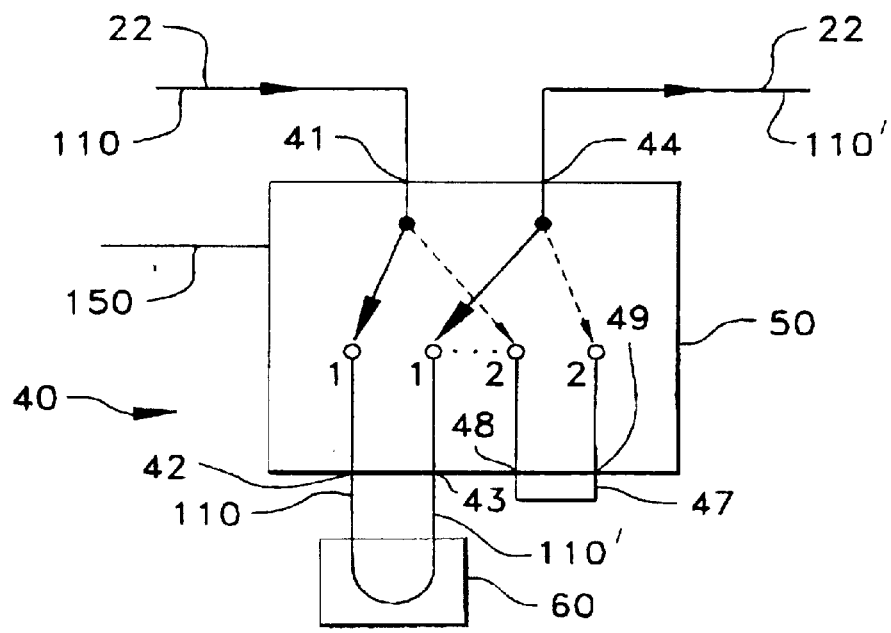
FIG. 5 illustrates an optical switch connecting a unidirectional optical fiber to an optical gas sensing cell and an optical bypass.
Figure 6:
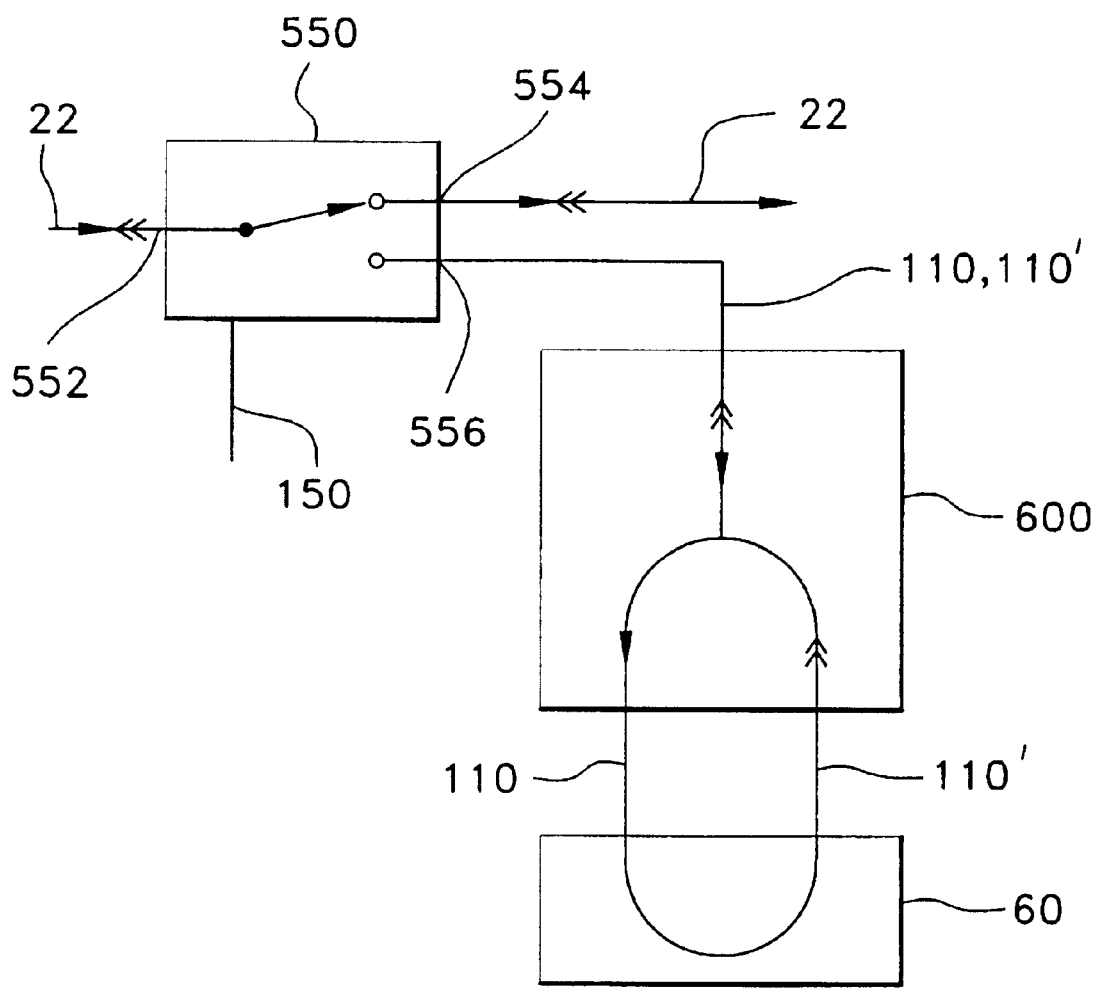
FIG. 6 illustrates an optical switch connecting a bidirectional optical fiber to a bidirectional optical circulator having a transmissive gas sensing cell.
Figure 7:
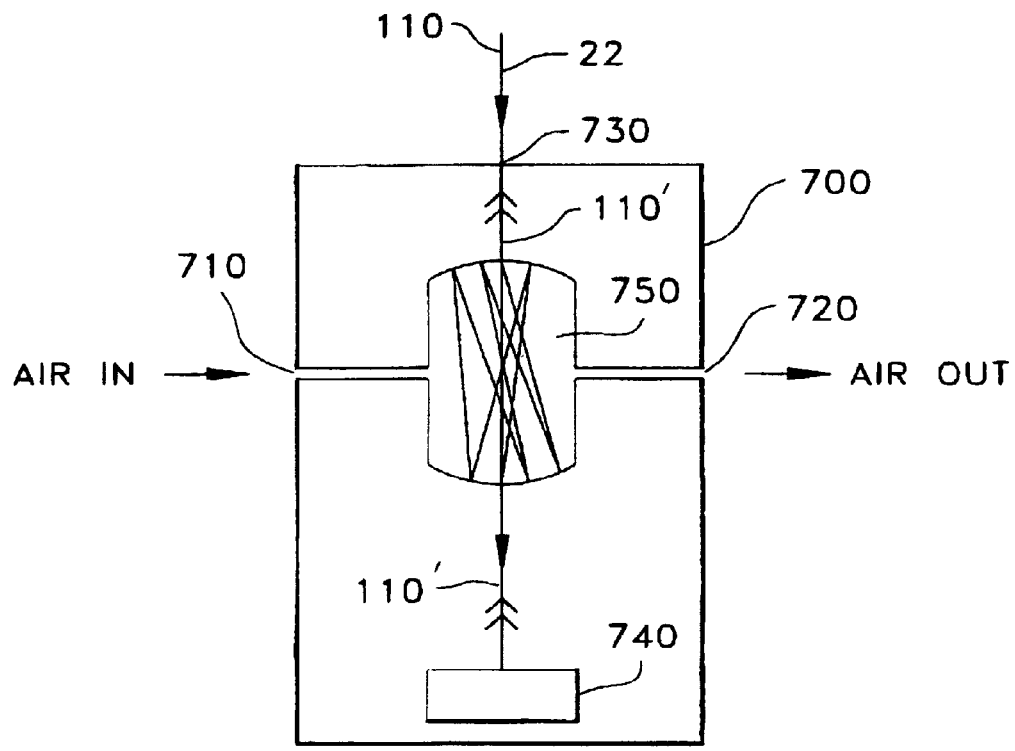
FIG. 7 illustrates an optical device having a one port reflective gas sensing cell.
Figure 8:
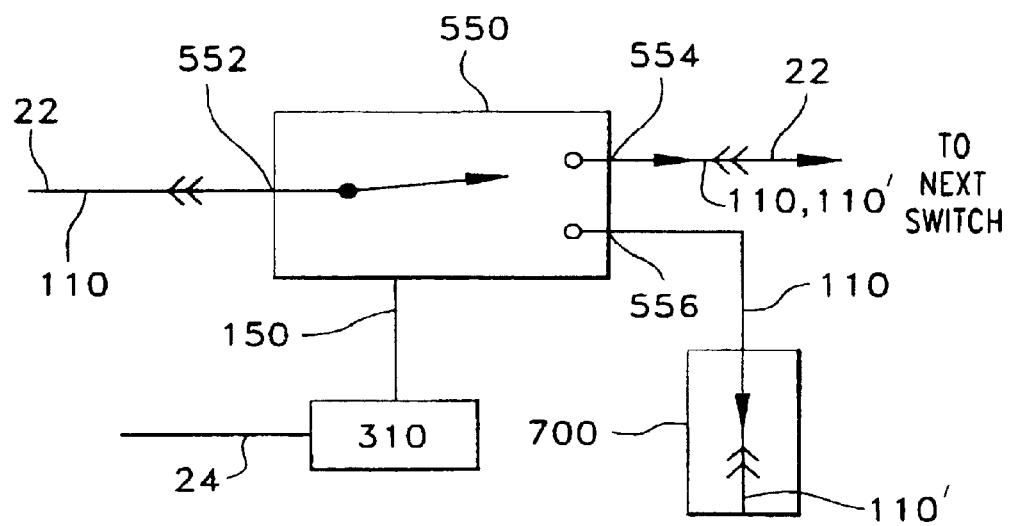
FIG. 8 illustrates an optical switch connecting a bidirectional optical fiber to another bidirectional optical fiber and a one port reflective gas sensing cell.

If a room is to be sensed, the optical switch 50 may route the light into the room into an optical device 60 connected to a gas sensing cell such as that shown in FIG. 7. It is understood that other gas sensing devices can be used such as, but not limited to, a segment of special optical fiber that is affected by its immediate environment; or an apparatus that sends the light beam across a duct, an airflow controller device, a valve in the duct, or through a portion of the room itself. The light is then sent back into the switch 50 and then to the next optical switch 50 in a unidirectional approach or reflected back to the source in a bi-directional implementation. FIG. 5 shows a diagram of a unidirectional optical switch used for unidirectional networks and FIGS. 6 and 8 show a bidirectional optical switch used for bidirectional networks.

If a particular room is not to be sensed, the optical switch 50 allows the light beam to bypass the room and go on to the next room. One of the factors for consideration in this structure is the optical attenuation loss that occurs as the light signal passes through the network. The most important part of this loss is the bypass insertion loss of the optical switches 50. Typical insertion loss for these units, including connector loss, can vary from 0.5 dB to a more typical value of about 1.0 dB to more than 2.5 dB depending on the type of optical switch technology employed. The complexity of the optical switch also affects the amount of loss. For example, a unidirectional optical switch like that shown in FIG. 5 will have twice the internal loss of a bidirectional optical switch like the ones shown in FIG. 6 or 8. This is caused by the typical use of a second switch in unidirectional optical switch devices. In the unidirectional switch approach, the detector should be at the end of the system. If the detector is located in the same unit as the light emitter then the bus will form a ring shape.

Referring to FIG. 1, the optical fiber 22 forms a bus structure making a full loop or ring that typically starts and ends at the location of the light source system 100 and detection system 200. The advantage of a ring configuration over a bi-directional system is that the path length is shorter by twice on average for the entire network. In addition, the path has a fixed length no matter which room is being sensed.

Figure 2:
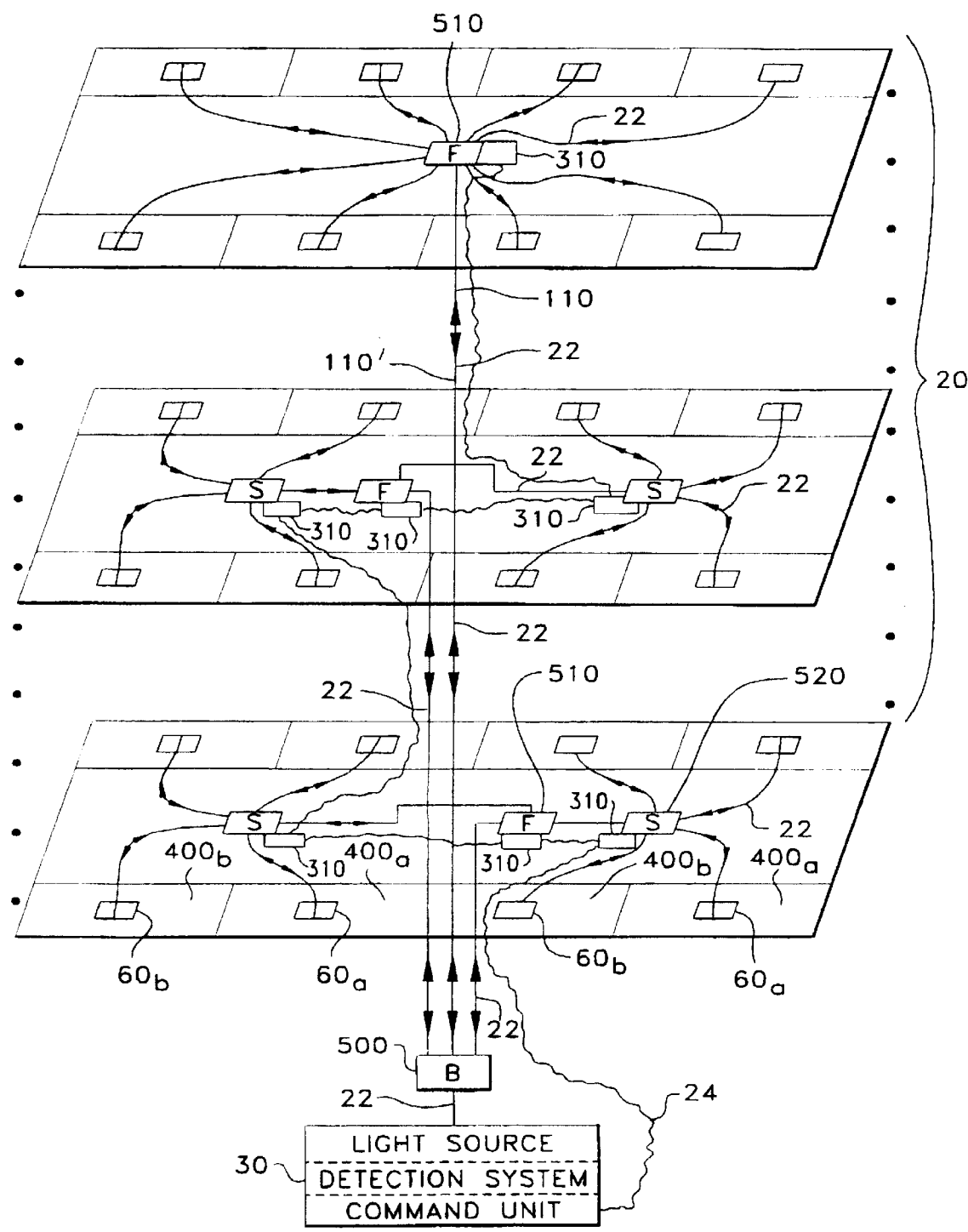
FIG. 2 illustrates a networked photonic signal distribution system according to an alternate embodiment of the present invention having a cascaded star network configuration.
Figure 4:
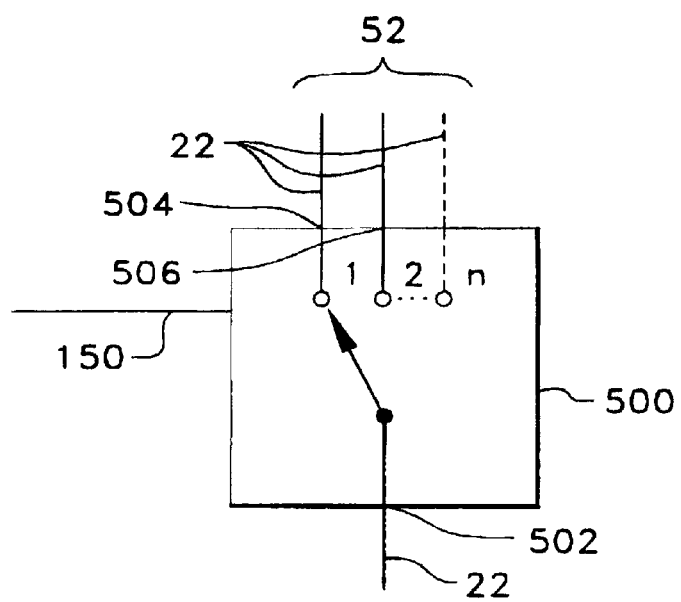
FIG. 4 illustrates a 1-X-n optical hub switch.

Referring to FIG. 2, the networked photonic signal distribution system 10 can have an optical distribution network 20 that is formed into a cascaded star network structure. The star network structure includes a plurality of electro-optical switches 500, 510, 520 (referred to as hub switches), that are connected to the optical fiber 22 to form parallel branches or tree-like network structures using the optical fiber 22. Unlike a single massive star approach with many fibers emanating from a single location, the tree structure uses much less cable due to the use of floor hubs 510, and sub-floor hubs 520 when needed. These lower level hubs or "branches" can be optimally placed to minimize cable runs in the network in many applications such as in buildings. The electro-optical hub switches 500, 510, 520 act as routing devices which can create a plurality of optical paths that form the optical distribution network 20. Typically, the electro-optical hub switches 500, 510, 520 are 1-X-N optical switch devices as shown in FIG. 4

Referring to FIG. 2, a building switch 500 routes the light beam from the common source, detection, and command system 30 to one of several floors, or sections of a floor, via an optical fiber 22 emanating from one of the output ports of the building switch 500. A secondary hub 510 on the two lower floors, switches the beam to one of a set of subfloors or tertiary hubs 520 that switch the beam into the actual room that is to be sensed. In this approach all the optical switching is done by the hubs 510, 520.

The electro-optical hub switches 500, 510, 520 can be identical in type, such as a 1-X-N switching device and are distinguished from one another by their location and function in the network. The outputs of electro-optical hub switches 500, 510, 520 are connected by means of the optical fiber 22 to a plurality of optical devices 60a, 60b, 60n that are independently responsive to a proximate external condition 400a, 400b, . . . 400n that effect a parameter of the light 110 thereby producing affected light 110'. The star switches 500, 510, 520 are controlled by a data communications and command unit 310 as shown in FIG. 2. The data communications and command units 310 are connected to the command unit 300 by means of separate electrical or fiber control networks 24.

Figure 3A:
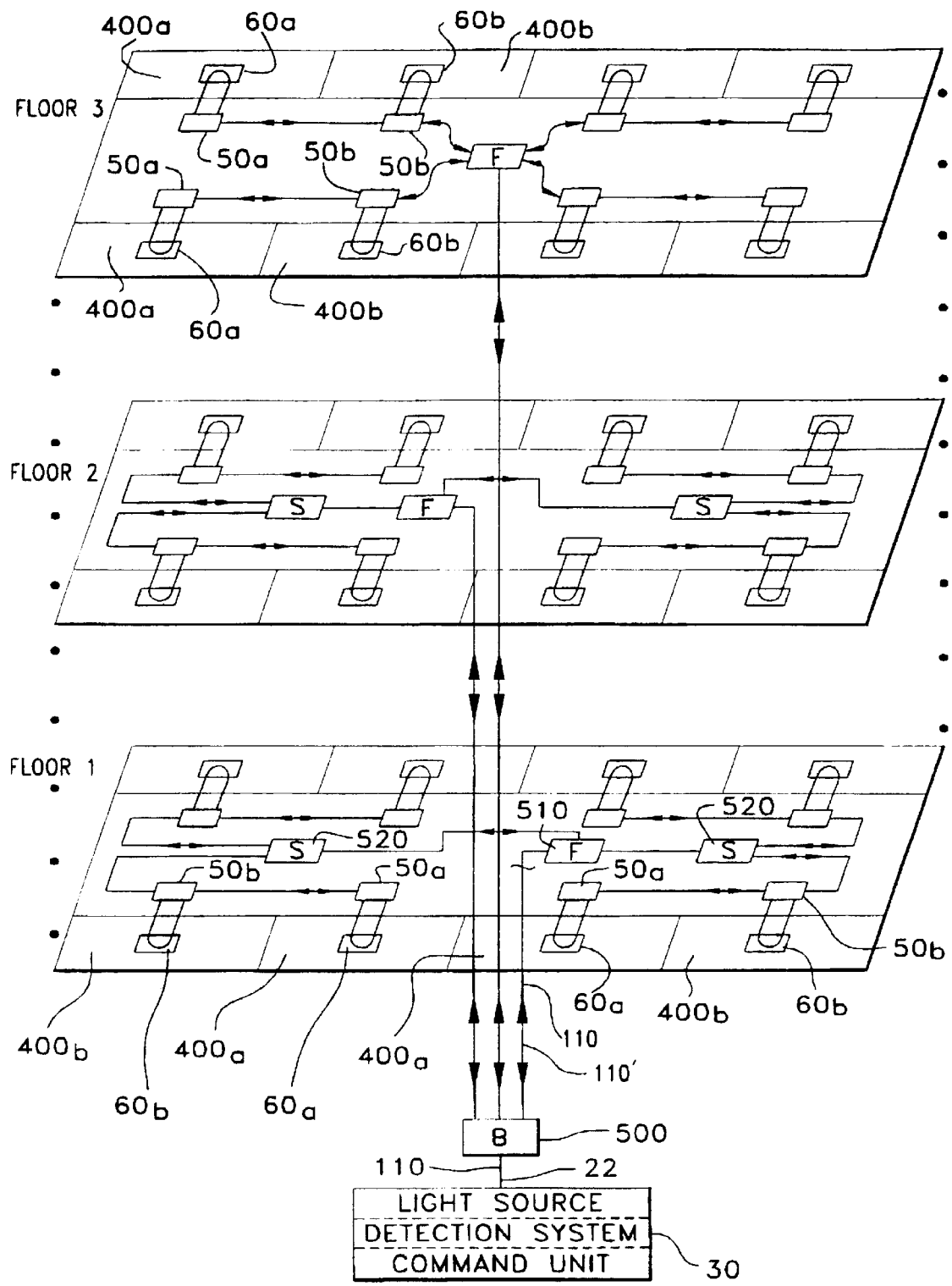
FIG. 3a illustrates a networked photonic signal distribution system according to an alternate embodiment of the present invention having a hybrid network of series and cascaded star network structures.
Figure 3B:
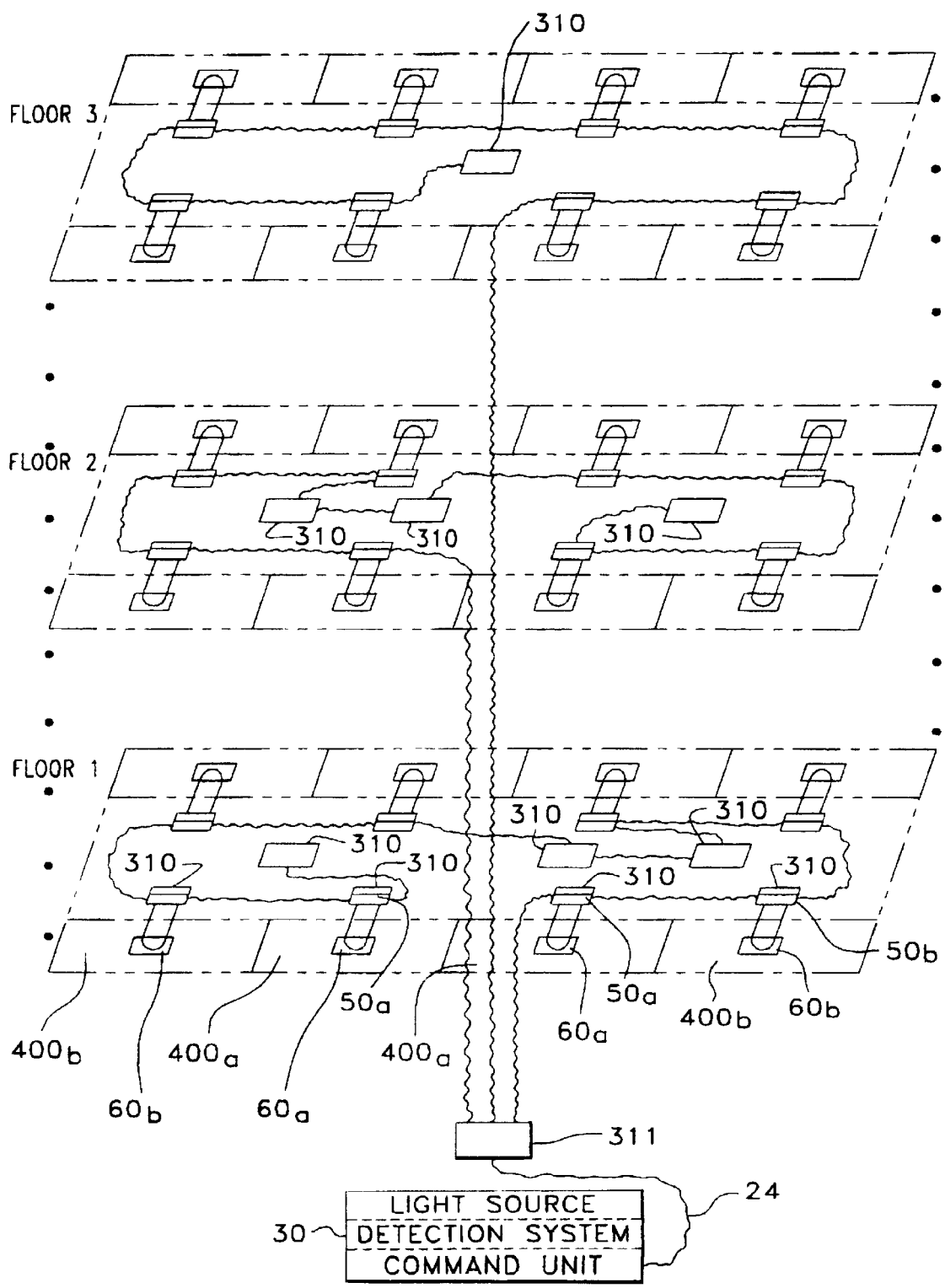
FIG. 3b illustrates a networked photonic signal distribution system according to an alternate embodiment of the present invention having networked data communication and command units.

Referring to FIGS. 3a and 3b, electro-optical hub switches 500, 510, and 520 can be arranged in a multi-level building having an optical distribution network 20 with both a bus and tree network structure. In such an arrangement, a networked photonic signal distribution system 10 can be used in a multi-level building having a common source, detection, and command system 30 that is connected by an optical fiber 22 to a 1-X-N base electro-optical hub switch 500.

In FIG. 3a, the first and second floor of the building has floor switches 510 that are connected to a tier of star switches 520 that are connected, by means of an optical fiber 22, to subfloor switches which are connected to a bus network of optical switches 50a, 50b, . . . 50n. The third floor of the building has outputs of the electro-optical hub switches 500 that are connected to a plurality of remotely distributed floor hub switches 510. The hub switches 510 can then in turn be connected directly to a smaller bus type network having single optical switches 50a, 50b, . . . 50n that are also connected to a plurality of optical devices 60a, 60b, . . . 60n.

Figure 11:
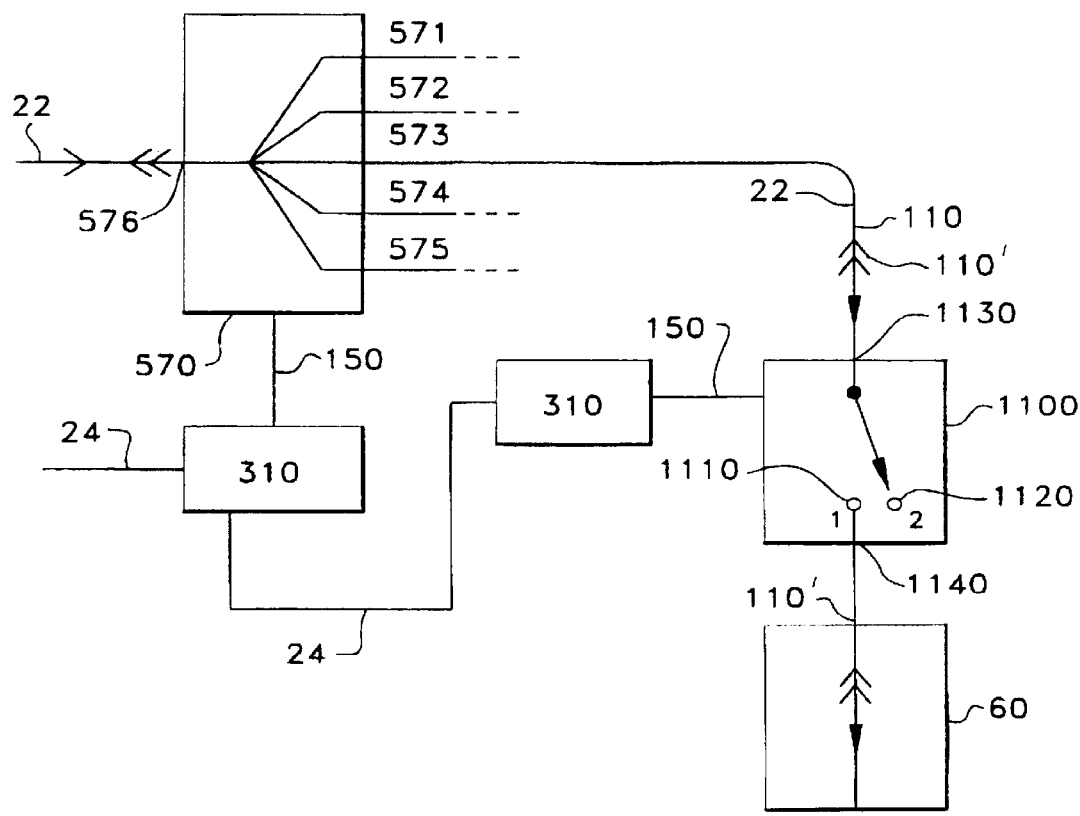
FIG. 11 illustrates a star coupler and a blocking switch having a first position bidirectional path and a second position path termination.

Optical switches, including hub switches 500, 510, 520 or individual optical switches 50a, 50b, . . . 50n, are controlled through a network of control and data communications units 310 as shown in FIG. 3b. Each of the control and data communications units 310 can be connected to at least one optical switch 500, 510, 520 as shown in FIG. 3b, or an optical switch 50 as shown in FIG. 3a. The connection between the control and data communications unit 310 and an optical switch can be through line 150 as shown in FIGS. 8 and 11. It is to be understood that one data communication and command unit 310 may contain multiple outputs 150 which are used to control multiple optical switches of either hub and/or single optical switch units like those shown in FIGS. 1–3. As shown in FIG. 3b, a router function may also be implemented by means of a router unit 311 that segments the electrical or fiber networks 24 to create three individual networks.

As mentioned earlier, a hybrid network may be formed by combining a cascaded star and series network structures as shown in FIG. 3a and 3b. In practice this approach, or variations of this approach, may provide the most flexibility for optical network applications. For example, in one application a cascaded star structure is used to bring emitted light 110 into a particular room. Within the room a bus structure might be used to pick up multiple sample points within the room. Alternatively, it may be more economical to reverse this structure and use a small bus along a portion of a floor coming off from a floor based hub. Within a room a small star structure is then used to pick up multiple points within the room itself. This may be more economical based on wiring costs since the points off from the intra-room star do not have far to go. Either or both options may be selected depending on the individual specifics of a room and floor situation to optimize the costs of wiring, optical cable, and component insertion losses.

Often, but not necessarily, the number of remotely distributed switches 50 equals the number of optical devices 60. Having an equal number of remotely distributed switches 50 and optical devices 60 is not essential. The optical distribution network 20 can have a combination of electro-optical hub switches 500, 510, 520 that can be directly connected to an optical device 60 or to a remotely distributed switch 50 that is itself connected to a plurality of optical devices 60a, 60b, . . . 60n connected in series or parallel for example. Depending on the configuration of the optical distribution network 20 selected, the light 110' effected by the external condition 400a, 400b, . . . 400n can be coupled to the optical distribution network 20 through the remotely distributed switches 50 or hub switches 500, 510, 520, or directly from the optical devices 60.

FIGS. 2 and 3 show bidirectional networks with light traveling in both directions in the same fiber simultaneously. In these networks the optical devices 60 may have air or gas sensing cells, an open path cell, or a fiber sensor that would have a reflective mirror or some means allowing the light 110 to be affected by some condition and sending the affected light 110' back through the network for detection. The emitted light 110 can be separated from the affected light 110' by means of a beam splitting circuit like that shown FIG. 9 described in detail below. An approach for a reflective gas sensing cell is shown in FIG. 7 (described later). Other reflective approaches can be used such as single termination devices which are inherently designed to reflect light back through their input/output port.

One advantage provided by the cascaded star approach shown in FIGS. 2 and 3 over the bus or ring structure of FIG. 1 is that a large amount of nodes can be accommodated with minimal loss caused by optical switches. This is partially due to the use of optical 1XN hub or star switches that have the same insertion loss of a simple SPDT or 1X2 optical switch used in the bus or ring switches.

By way of example, a 100 node ring network would encounter a loss of 100 dB due to a 1 dB insertion loss from each optical switch. On the other hand, the structure shown in FIG. 2 with three levels of hubs, each having 5 outputs (1×5 switches), could accommodate 125 nodes. If the insertion loss of each hub is 1 dB the insertion loss of the system due to the switches would only be 6 dB if each hub had a 1 dB loss. This results from 3 dB of loss to get to the end node and 3 dB more loss to get back to the detector. Although more cable would be used in this system, the overall attenuation loss is less. Additionally, since the actual signal path length is shorter, the loss due to cable attenuation is also less in the structure of FIG. 2.

In unidirectional operation, the optical fiber 22 will have emitted light 110 and affected light 110' moving in one direction on the same fiber 22. In bidirectional operation, the optical fiber 22 will have emitted light 110 and affected light 110' moving in opposite directions on the same fiber 22. Therefore, for bidirectional operation, care must be taken in the selection of components and in the installation techniques and quality to avoid even minor reflections from any components or splices. These reflections will appear as noise reflected back to the detector circuit which depending on their amplitude could reduce the system sensitivity or make certain types of measurements impractical.

Figure 10:
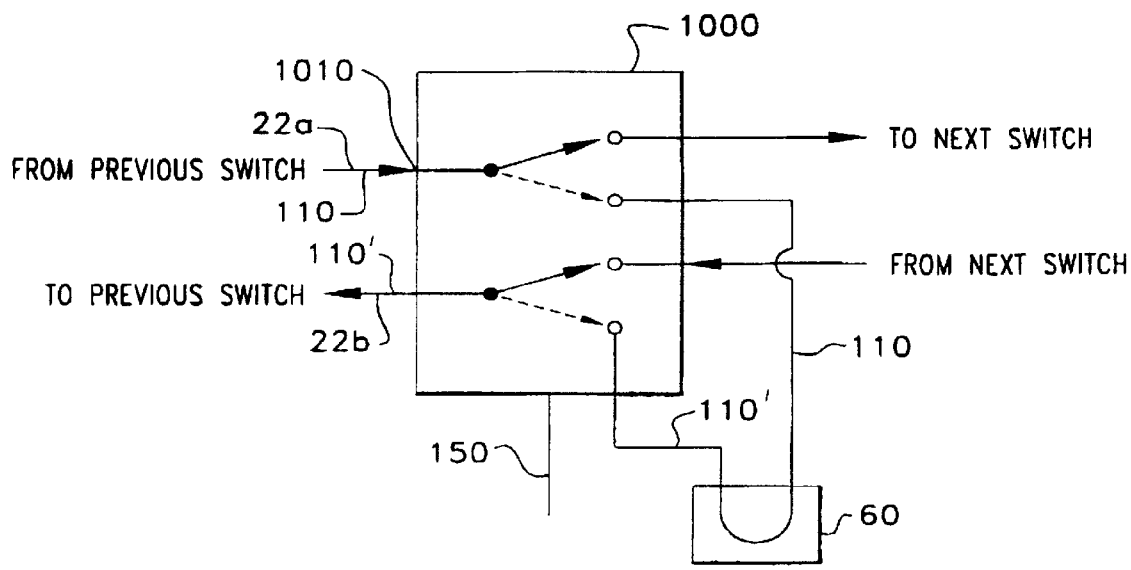
FIG. 10 illustrates a six port optical switch connecting an optical device and two optical fibers operating in a duplex optical network.

Another network approach not shown but contemplated by the invention includes a duplex concept that adds another fiber path and set of switches to form a completely separate return path. For example, a cable containing two separate fibers may be used to create two individual parallel optical paths to form the duplex optical network. A switching device for a duplex optical network operation is shown in FIG. 10 and discussed in detail below. The duplex approach with a dual fiber cable is also usable with the star or hub type of structure shown in FIG. 2. This assumes that both the source and the duplicate return hubs are located in the same location. If this is not true then two separate fiber cable systems must be run. Although this provides more flexibility in the separation of the light source 100 and detector 200; it is also potentially more expensive then installing twin fiber cable which is a standard type of cable used in fiber based Ethernet type communications systems (10BaseF or 100BaseFX). Duplex systems have advantages of simplicity and more flexibility than the unidirectional or bidirectional single fiber systems. Higher costs due to the use of dual fiber cable and, more significantly, duplicate sets of switches can, however, discourage this approach.

A significant advantage of a unidirectional single fiber architecture, like that used in a bus or ring network structure, is that multiple locations can be sensed at the same time. This is particularly useful for immediate detection of spills or the presence of large gas or particle concentrations over a large area.

In this approach, emitted light 110 is fed into the optical devices 60 of multiple rooms instead of selecting one room and bypassing all the other rooms. This simultaneous monitoring concept is more difficult to accomplish in bidirectional systems since the light 110 is reflected by the end sensor directly back to the detector. In unidirectional systems, simultaneous sensing is made simple by turning on multiple switches 50.

Gross detection of one or more external conditions from a group of areas can be cascaded in a star or hybrid network by replacing one or more of the electro-optical hub switches 500, 510, 520 by optical star couplers such as JDS Fitel ACW series switches. Couplers used in combination with optical switches such as shown in FIG. 11 can provide simultaneous monitoring of many areas by again simply turning on multiple optical switches simultaneously.

For example, subways, airports or other public places have a plurality of areas where people can congregate. For example, in airports, there are often a plurality of terminals where passengers can board and exit aircraft. It is of considerable concern to airport and other authorities that unscrupulous individuals could seek to spread contaminants including biological or chemical agents by exposing passengers or articles passing through open or confined areas in the airport or other public places. By means of the present invention, selective detection of contaminants can be accomplished in preselected areas as described above or over a broad range of areas.

If a bus structure is desired, but a star type wiring pattern is preferred, a bus structure can be used that is wired in a star structure. In this approach, each leg of the star structure is a twin fiber cable where one fiber brings the light to the optical switch 50 and the other fiber brings the light back to the star. The star structure is used as a cabling junction to connect these twin fibers together into a continuous series or bus structure. This approach uses more cable than a direct point to point approach, but it may provide more flexibility particularly if other cables used for other purposes are being supplied to the same locations.

Another approach to a star architecture replaces the switch hubs 500, 510, 520 shown in FIG. 2 with star couplers (1XN devices) 570 shown in FIG. 11. One example of this type of coupler (sometimes known as a beam splitter) is a JDS Fitel ACW series Planer Lightwave Circuit technology Waveguide Splitter. If in FIG. 2 the Bldg Switch hub 500 and potentially also the Floor switch hubs 510 are replaced with 1XN couplers then the Sub floor hubs 520 act to select the appropriate end node location to be sensed.

The added simplicity of this approach is counterbalanced by increased loss from the coupler. Ideally the loss of a coupler is directly related to the amount of outputs. For example, a 1X10 coupler would have a 10 dB attenuation. Typical values of actual devices may in fact be slightly higher. If alternatively, all of the hubs are replaced with star couplers then the end nodes must also incorporate a simple SPST type switch 1100 as shown in FIG. 11.

FIG. 11 shows a star coupler 570 having five outputs 571, 572, 573, 574, and 575 used to replace the lowest level (either floor or subfloor) hub switch in the system shown in FIG. 2. The star coupler 570 has one input 576 connected to the fiber 22. FIG. 11 also shows an SPST switch element 1100 having a port 1130 connected to port 573 of the star coupler 570 via fiber 22. The switch 1100 is switched on and light 110 exits the switch through port 1140 and enters the optical device 60 where the light 110 is affected by an ambient condition and exits the optical device as affected light 110'. The affected light 110' returns back through ports 1140 and 1130 and travels back through the coupler 570 and the rest of the levels of star couplers (if more than one level is used) in the photonic signal distribution network 20 to the optical detector system 200. If this switch is not selected, the light 110 enters the switch through port 1130 and is then absorbed in the switch or shunted to a internal or external port 1120 where the light 110 is absorbed by the switch or by some form of antireflection attenuator or low reflectance optical terminator. An alternative approach to implementing switch 1100 is one based on LCD or liquid crystal display technology in which the light 110 is passed through an LCD switch element that is either made transparent or opaque to accomplish the transmission or absorption of light through the switch.

In terms of performance regarding loss, a star coupler system with 125 nodes and three levels of 1X5 star couplers 570 would have a theoretical loss from the hubs of 21 dB (3 times 7 dB per coupler) plus an equivalent amount of return loss or another 21. When another 1 dB is added for each pass through the SPST switch 1100 the total loss would be 44 dB. If hub switches are used as the end devices instead of hub couplers and SPST switches, the loss can be reduced to 30 dB.

The networked photonic signal distribution network 20 may also include at least one optical amplifier 320 such as, but not limited to, an erbium-doped optical-fiber amplifier anywhere along the optical fiber 22 as shown in FIG. 1. The optical amplifier is used to amplify the light within the optical fiber 22 to compensate for loss that occurs in the light 110 and affected light 110' as the photonic signal travels through the fiber and switches of the photonic signal distribution network 20. The advantage of using optical amplifiers is their ability to amplify a band of the optical spectrum versus just one frequency by 20 to 40 dB. Consequently many separate wavelengths of light can be faithfully amplified and reproduced in frequency, phase and amplified magnitude. Current units such as the erbium doped variety can accommodate a wavelength range of 1.53 to 1.56 micrometers such as the JDS Fitel Series EdFA-1300 units. Newer units from Lucent Technologies can span 0.08 micrometers. The use of these amplifiers is akin to a repeater in an electronic digital network. In the photonic signal distribution system it allows a longer bus structure or more optical switches to be used in the same network thus allowing the common source and detector to be multiplexed over many more measurement locations.

Figure 14:
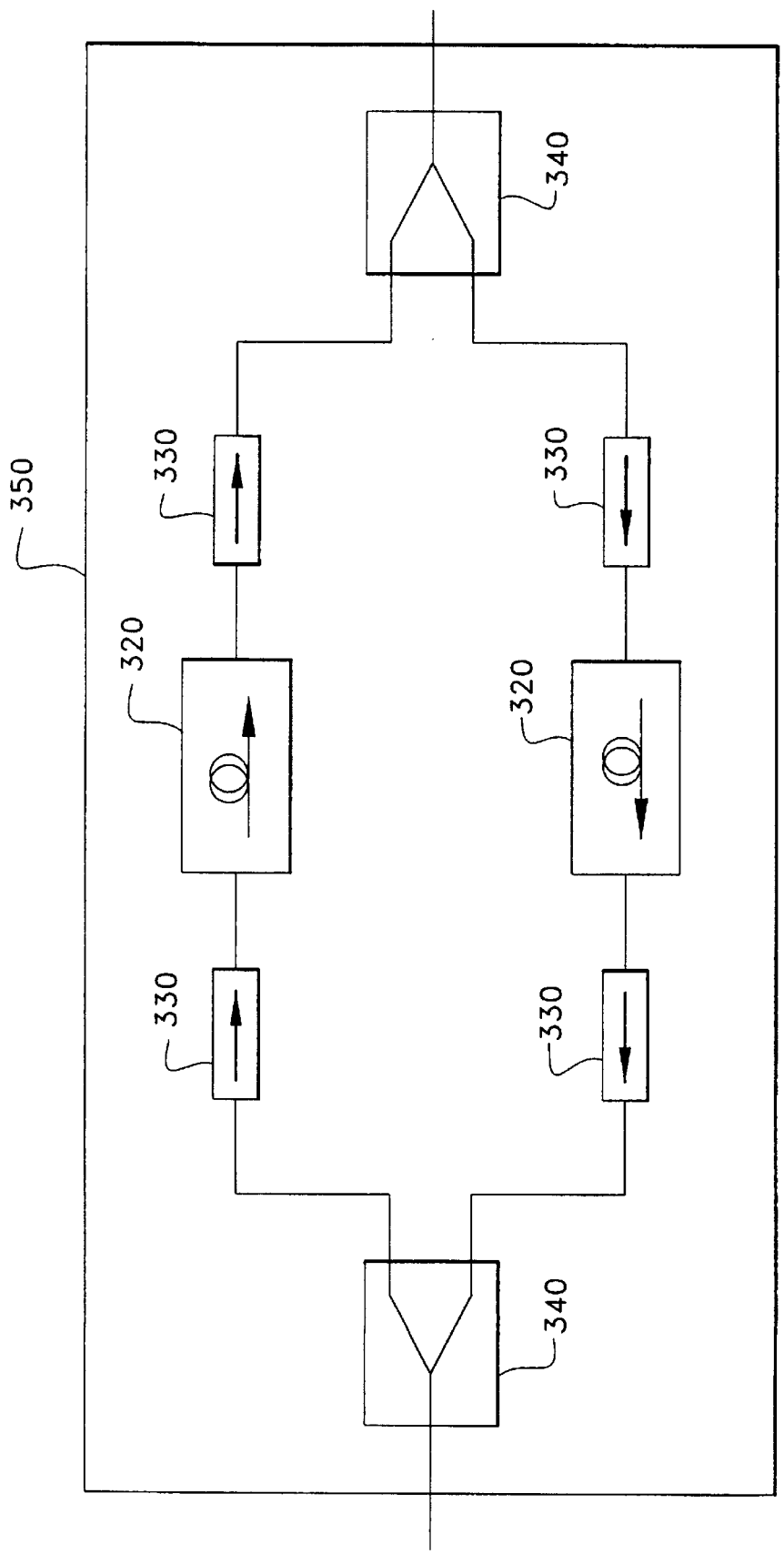
FIG. 14 illustrates a bidirectional optical amplifier system with two unidirectional optical amplifiers.

Amplifier units 320 are typically unidirectional devices, although bidirectional units are possible. If unidirectional units are used in a bidirectional system then two amplifiers must be used; one for each direction. FIG. 14 shows a bidirectional amplifier 350 made out of two unidirectional amplifiers 320. Optical isolators 330 are used to maintain the proper direction through the respective amplifier as well as to block the oppositely moving light. The 1X2 optical couplers 340 are used to split and couple the light back together. Optical amplifiers either unidirectional or bidirectional can be used in the central trunks of cascaded star or hybrid systems. In a cascaded star coupler approach, a unidirectional or bidirectional optical amplifier can be used advantageously at the input of a large star coupler to compensate for their losses as well as the losses of other system components.

Another approach to solving the attenuation problem in network systems is the use of pulsed light. This solution involves emitting a higher amount of power over a small portion of the entire pulse. For example, one watt of signal power can be generated for only one thousandth of the pulse period and still have a total average power for the entire pulse width of 1 milliwatt making the emitted light eye-safe.

Pulsed light is particularly applicable to a ring architecture where the attenuation of the system is constant regardless of which location is sensed. Consequently the pulse power can be easily set to a constant value to always yield a good signal strength at the detector. Architectures with a variable loss depending on the location may need to have the source pulse power varied based on the selected location, or the detector will need the ability to handle large variances in the detected power without saturating or overloading. Alternatively a variable attenuator, located for example in front of the detector or the source, could be used that has its attenuation or loss controlled based on the selected location.

The location of the source of light 100 and detector 200 can be varied. In a bidirectional implementation it is simplest to locate the source 100 and detector 200 in the same location. An example of a bidirectional common source, detection, and command unit is shown in FIG. 9. An optical coupler 600 (or alternatively a circulator) is used to connect both the source 100 and the detector 200 to one fiber 22. If needed, optional optical isolator 330 can be used to prevent the returning affected light 110' from reflecting off or entering the source unit 100. Inside the source unit 100 is located the actual light emitter 170 which may be either a broadband light source, an LED, a laser, or some other light source operating at a wavelength that can be transmitted through the optical fiber. Through the use of materials such as plastic, silica, glass or fluoride glasses, wavelengths covering the visible spectrum up into the intermediate infrared light spectrum can be accommodated.

A source driver 180 is also shown which can control parameters such as timing, amplitude, wavelength, phase and other characteristics of the light emitter 170. Control can be accomplished by signals and command information generated by the command unit 300. Detection system 200 consists of a detector unit 270 having a photodiode, or some other type of light detector, that is coupled to a detector front end circuit 280 appropriate to the particular optical detector 270. The front end 280 operates upon and converts the detected signals from the detector unit 270 into a usable signal or data format.

The detection system 200 may also utilize a processing unit 290 that contains circuitry or a computer unit to perform processing and detection analysis to convert the output signals and information from the detector front end 280 into user recognizable data such as a PPM concentration level of a sensed gas or a temperature in ° C. or humidity in % RH (Relative Humidity) of the sensed space. Signals and command information needed to operate the detector front end 280 and the processing unit 290 may be provided by the command unit 300. Systems with a control network 24 and a command unit 300 will be connected to the control and data communications units 310 through network 24 and used to control the optical switches through the same connection. Higher level functions such as a Graphical User Interface (GUI) with an operator may be achieved through the command unit 300 which may be used to execute commands from, or provide information to, such other external interfaces and control systems as is required through a connection 26 with other devices in the system 10 or other systems in the building.

In another aspect of the invention, it may also be desirable to locate the source 100 and detector 200 in different locations. For example in a bus structure of the photonic signal distribution system 20, it may be easier to locate the detector 200 at the end of the bus rather than incur the extra optical fiber losses to run a length of the fiber 22 from the last sensing point back to the source location. Cabling and installation costs can be lowered by this as well. Any coordination between the two devices can be done by a dedicated electrical signal line or through the control and communications network 24 that controls the optical switches 50, 500, 510, or 520.

Alternatively, a different configuration involves the light 110 of a common source 100, or from one of potentially multiple dispersed or remotely located centralized sources 100, switched to the location 400 where air is to be sensed. However, rather than sending the modified light 110' back into the fiber 22 and to a common detector 200, there can be a light detection system composed of a plurality of individual detection units 200 (or at least the detector element 270 and potentially the detector 280 as well) located near the sensed locations 400 to provide the detection function locally. This approach provides an economical solution for applications where the detector element 270 is an inexpensive device (a photo-diode for instance) and the immediate signal processing of element 280 can be done locally and economically at the sensed location. For example, the airflow control electronics already located in the room may be able to do the signal processing with little added cost.

More complex processing of the signals, such as done by processing unit 290, can still be done centrally in a computer or workstation for example by sending the information back through the data communications network 24. This approach may also be desirable where the return optical path 22 is expensive in terms of components and/or installation or would incur added insertion losses. Required coordination between the source 100 and the individual detectors 200 or units 270 and 280 may also be achieved through the use of the control and communications network 24 which is controlling the optical switches 50. This approach would be useful in a cascaded star network using star couplers vs. switches since having the detectors near the sensed locations 400 effectively cuts in half the significant power division losses of this or other approaches by eliminating all the return losses.

In another aspect of the invention, similar to above, multiple emitters 100 are located near the sensed locations 400 with the light passing directly into the optical device 60. The multiple emitter devices 170 may use a direct coupling from the emitter device such as a Light Emitting Diode or Laser diode into the sensed environment or air or it may pass through a short length of fiber to get to the sensed air volume contained or sampled by the optical device 60. Once the affected light 110' is passed though the sensed volume it enters an optical fiber 22 and is routed though the fiber network 20 using optical switches 50, 500, 510, or 520 to a centralized or common detector 200, or to one of potentially multiple centralized detectors 200 that may be dispersed or remotely located throughout the system. As with the multiple localized detector system, this approach may be more cost effective where the cost of extra fiber 22 and/or components and resultant increased insertion loss would outweigh the cost of the extra sources 100 (or equivalently optical detector elements 170 and their driver equipment 180). This approach may even be more cost effective when the source is an inexpensive broadband LED or inexpensive laser diode.

New Vertical Cavity Surface Emitting Laser diodes (VCSEL's), such as made by Honeywell's Microswitch division for example are relatively inexpensive and easy to drive yet have high output power and narrow line width performance. For example, when sensing particles a single LED or laser diode can be used that operates continuously or is turned on when needed with virtually no special control requirements. In this application, complex features can be placed into the detection algorithms which are part of a centralized computer and software system.

For multiple localized emitter applications the switching function may be completely handled with on/off or pulsed control of the emitter 170. Consequently fewer or potentially no optical switches need be used in the network. In this specific case optical couplers could be used to gather the signals throughout the network and sent to common detector (s).

One of the advantages of the optical switch network concept is the ability to dynamically reconfigure a network as described earlier with the use of series bypass and hub/star type switches. Another option available to even further extend the flexibility of this type of approach is the availability of NXN or MXN type cross-connect or matrix switches such as Dicon Fiberoptics GP700 series of fiber optic matrix switches. This can be particularly useful if a system has multiple sources located throughout the network and/or multiple detectors that are located in different locations as well. Although not required, matrix switches are the most general switch connection approach and they have the advantage that they allow various separate networks to be combined dynamically. For example, two separate sensing networks can be combined from time to time to allow cross-checks of accuracy between the systems by measuring the same location. Breaks in the network can potentially be dynamically fixed by reconfiguring the network around the break.

Optical Switches and Devices

The remotely distributed switches 50 can be configured in a variety of forms to meet different network architectures and needs. Similarly, optical devices 60 can include a number of different forms for responding to different external conditions including network approaches. The following are examples of remotely distributed switches and optical devices that can be used with the present invention.

Referring to FIG. 4, the hub switch 500 is a bidirectional switching device having a common port 502 and at least two isolated ports 504, and 506 for selectively switching the common bidirectional port 502 to at least one of the isolated bidirectional ports 504, or 506. The control of the switch is through a control line 150 which commands the switch to one of it's switched states The photonic signal distribution system 10 may include a plurality of hub switches 500 which are typically connected by means of an optical fiber 22 to other remotely distributed switches 50 or 500 and optical devices 60. As explained above, the electro-optical hub switches 500, 510, and 520 are identical 1-X-n switching devices that are distinguished from one another by their location and function in the network. An example of a hub switch is a JDS Fitel series SK fiber optic switch modules FIG. 5 illustrates a DPDT type optical switch 50 configured to be used in a unidirectional bus or ring structured network to connect an optical fiber 22 to an optical device 60 and an optical bypass 47. The optical switch 50 has a plurality of optical ports 41, 42, 43, 44, 48, 49. The state of the would be commanded through control connection 150 which is provided a control signal that would typically be of an electrical nature. The optical switch 50 is connected to the optical distribution network 20 by means of the optical fiber 22 which is coupled to one set of the optical ports 41, 44.

In one aspect of the invention, an optical switch 50 as shown in FIGS. 4, 5, 6, 8, 10, 11, and 12 can be controlled by control signals which would typically be electrical in nature. These signals are provided to the optical switch 50 by an electrical connection 150 from a control and data communications device 310 that is connected to an existing electrical network (not shown), or a new electrical network 24 such as that shown in FIG. 1. The control and data communications device 310 in turn receives its commands from data generated by a command unit 300. Alternate physical control signal formats could be of an analog or digital signal format in electrical, pneumatic, radio frequency (wireless), or optical form.

In response to the control signal on line 150, the optical switch 50 shown in FIG. 5 switches the light 110 on the optical fiber 22 to an optical device 60 coupled to another set of optical ports 42, 43 or to an internal or external optical fiber by-pass 47 coupled to yet another set of optical ports 48,49. The optical device 60 is designed to change the light in response to a detected condition or substance. The affected light 110' contains information related to the area proximate to the optical device 60 and is directed to the detection system 200 by means of the optical fiber 22 and the electro-optical switch 50.

FIG. 6 illustrates an optical switch 550 used in a bidirectional bus or ring architecture to connect a bidirectional optical fiber 22 to a bidirectional optical circulator 600 having a two port optical device 60 such as a transmissive gas sensing cell. The optical switch 550 is the optical equivalent to a traditional single pole two position (SPDT) electrical switch. The optical switch 550 has a plurality of optical ports 552, 554, 556 and a control connection 150. The optical switch 550 is connected to the optical distribution network 20 by means of the optical fiber 22 which is coupled to one optical port 552. The optical switch 550 couples or bypasses the bidirectional optical circulator 600 and two port optical device 60 with respect to the optical fiber 22.

An example of a SPDT optical switch is a JDS Fitel series SW optical switch. Optical switch configurations can also be built using other technologies such as planar or silica based waveguide technology or the fruitful area of micromachined devices such as micro-machined mirror switch technology such as those developed by Texas Instruments. Another variation of optical switches is manufactured by AMP corporation which uses center-symmetrical reflective (CSR) optics. Other technologies such as single mode thermo-optic switches utilizing a Mach-Zehnder interferometer manufactured by Photonic Integration Research are also commercially available. Future approaches such as those that might involve a light beam to switch another light beam may also be possible. Simple SPST type switches, such as shown in FIG. 11 can also be implemented with LCD technology.

In response to a control signal the optical switch 550 switches the light 110 on the optical fiber 22 to the optical circulator device 600. The optical circulator device 600 can be any commercially available device such as a JDS Fitel CR2300 series optical circulator. The function of the optical circulator 600 is to send the light 110 from the photonic distribution network 20 through the optical device 60. The circulator then changes the direction of the light sending it back down the optical port 556 of the optical switch 550. This creates a bidirectional modified photonic signal 110' that will travel back down the same path it came to the source 100 and detector 200 unit. When the optical circulator 600 and optical device 60 are bypassed, the optical fiber 22 is coupled to optical switch 550 through ports 552, 554.

The optical device 60 associated with the optical circulator 600 is designed to change the light in response to a detected condition or substance. The affected light 110' contains information related to the area proximate to the optical device 60 and is directed to the detection system by the optical fiber 22 by means of the optical circulator 600 and electro-optical switch 550.

FIG. 7 illustrates a one port optical device 700 having a reflective gas sensing cell 750 that represents one form of an optical device 60. The one port optical device 700 includes a multiply reflective transmissive sensing cell 750 for multiply-reflecting and changing the light 110 according to the environment entering the sensing cell 750 through its inlet 710 and outlet 720. A terminal reflective device 740 is provided for reflecting the affected light 110' out of the cell 750 by means of the port 730 coupled to the optical fiber 22.

Figure 15A:
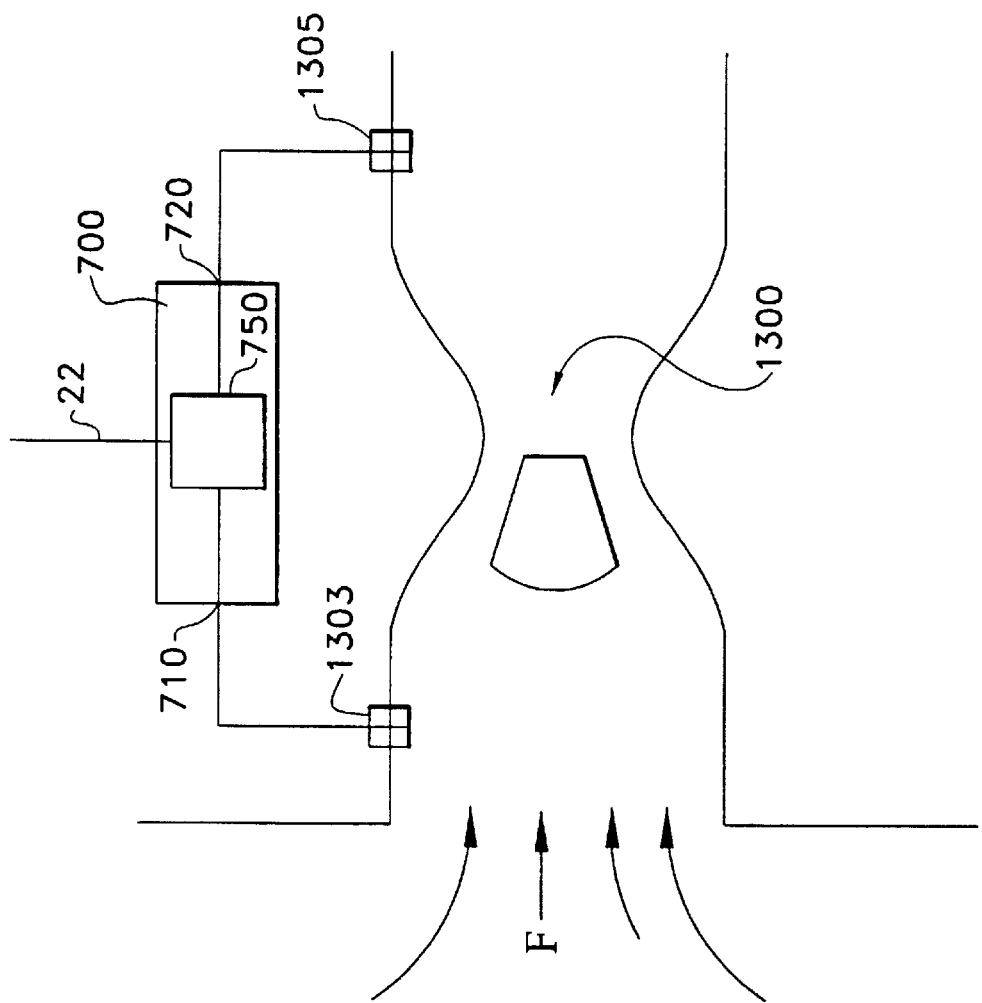
FIGS. 15a–15c illustrate optical paths formed in an air flow control device having a gas sensing cell.
Figure 15B:
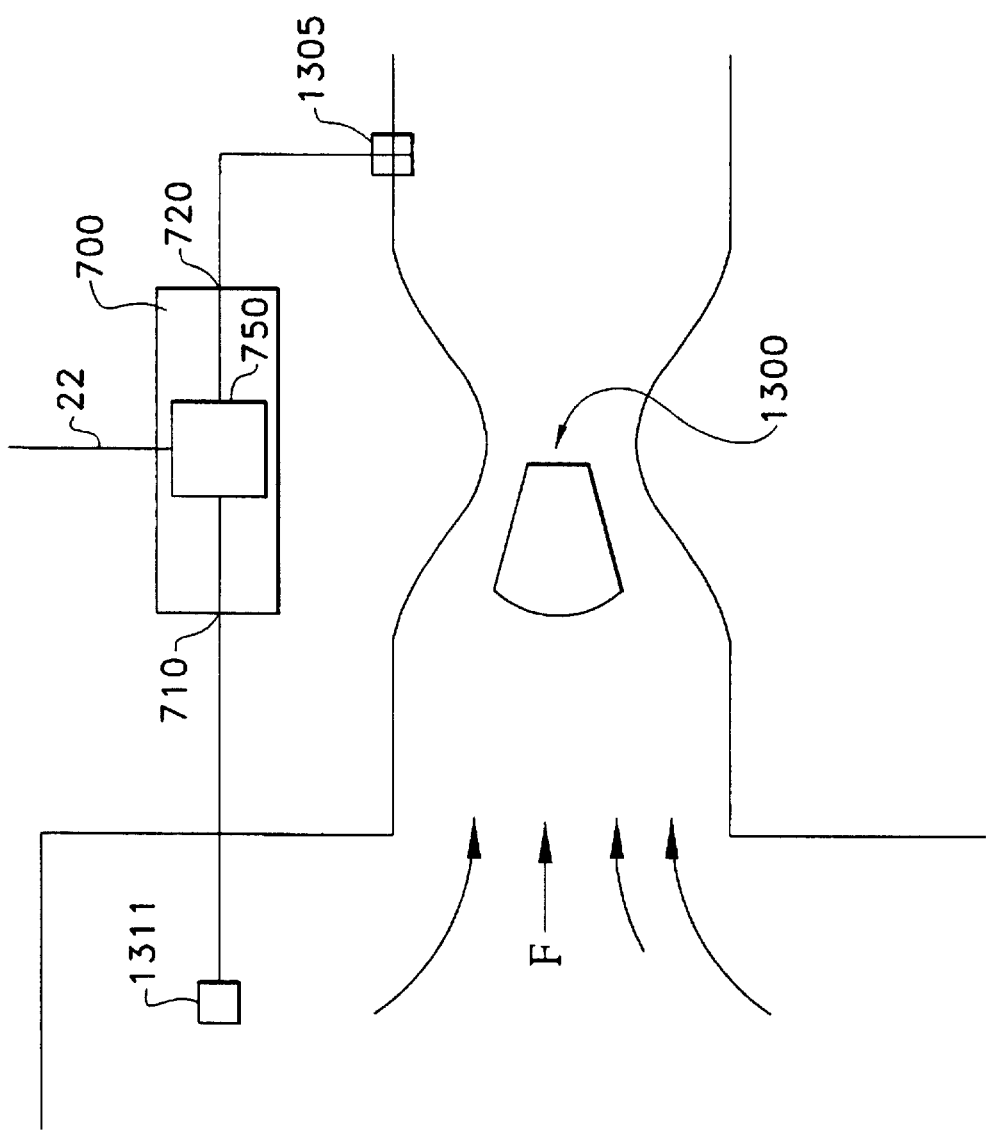
Figure 15C:
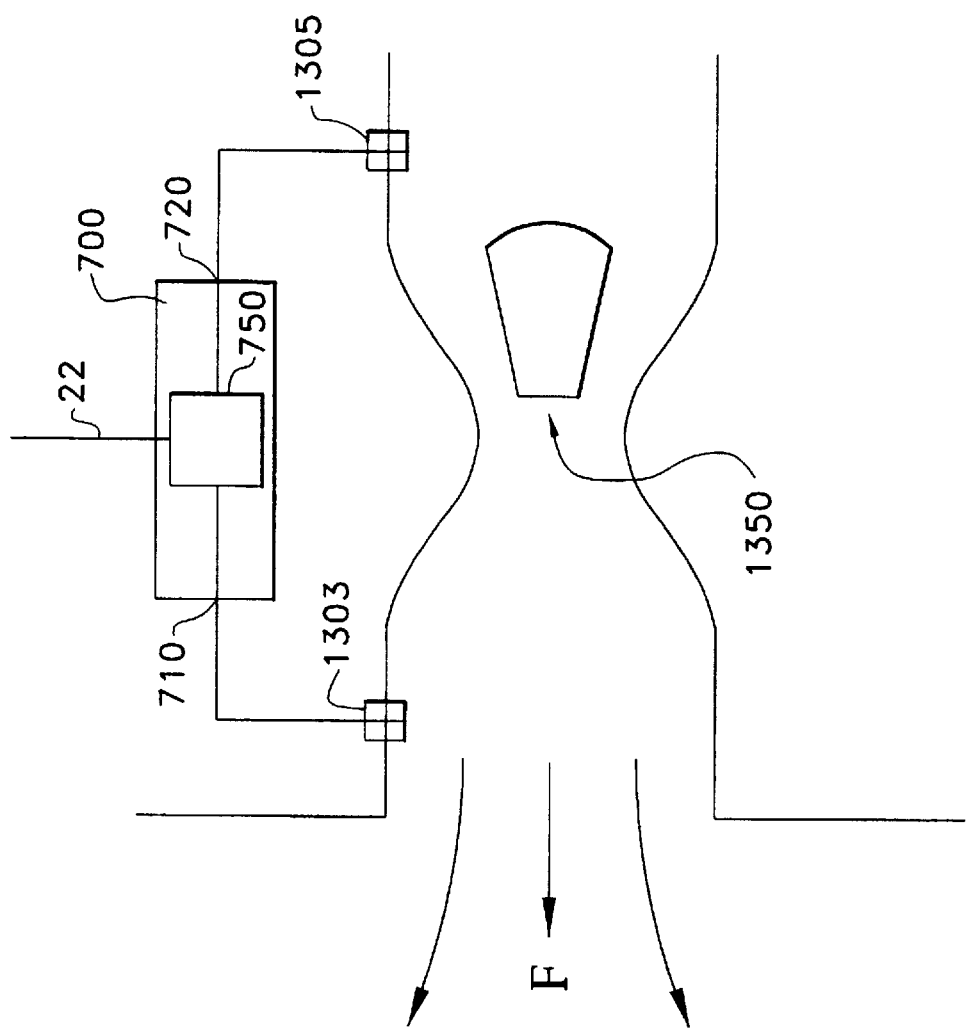

FIGS. 15A–15C illustrate different ways that the an optical device 60 in general (and specifically for example with the gas sensing cell 750 of FIG. 7) can be used to measure gases or other environmental measures such as particulates, humidity, temperature, or others.

FIG. 15A illustrates a configuration for taking an averaged sample from an exhaust duct flow. The input and output ports 710 and 720 of gas sensing cell 750 are connected through a pair of pressure taps 1303 and 1305 respectively to straddle an exhaust valve 1300 in the exhaust duct in which the sample is taken. Instead of straddling an exhaust valve 1300, the gas sensing cell 750 could also be connected to straddle another device which creates a pressure drop within an air flow. For example, the gas sensing cell 750 could straddle an airflow controller, a damper, an orifice ring, an elbow or simply a restricted length of duct. Assuming the air flow through the exhaust valve 1300 to be in a direction F, there is a high relative air pressure at pressure tap 1303 and a low relative air pressure at pressure tap 1305. Therefore, a small portion of the air flow through exhaust valve 1300 is bled off by pressure tap 1303, and diverted into the gas sensing cell 750. Some of the air already in the gas sensing cell 750 is returned to the exhaust flow, just downstream of the exhaust valve 1300. The sample in the gas sensing cell 750 contains a mixture of air from the flow, retained in the gas sensing cell 750 for a period of time. The sample thus forms an average of the contents of the flow over the period of time.

As shown in FIG. 15B, the gas sensing cell 750 may be connected to a sampling head 1311 located within the space whose air quality is of concern, instead of pressure tap 1303. This configuration will measure the average flow of airborne substances from the space that is exhausted by exhaust valve 1300, e.g. a room.

In yet another variation, there is shown in FIG. 15C a gas sensing cell 750 connected to straddle an air supply valve 1350 or another element causing a pressure drop in the duct air flow. This system operates similarly to that discussed above in connection with FIG. 15A, but measures and averages the air flow in a supply duct, rather than in an exhaust duct. This may be useful for discovering cross-contamination from other parts of an air management system, defects in the air supply system, or for controlling the make-up air supply in response to an emergency condition detected elsewhere.

Figure 16:
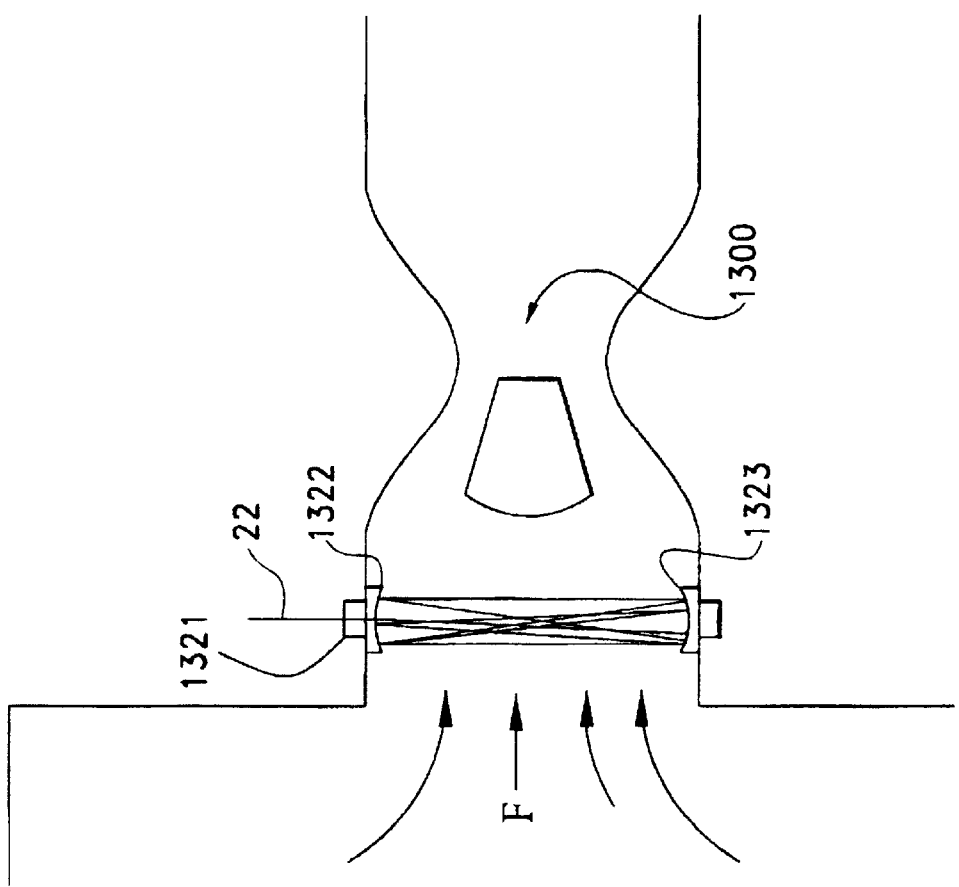
FIG. 16 illustrates an optical path formed in an air valve having a gas sensing cell.

An alternative approach to the use of a separate gas sensing cell is to integrate the optical path of the light beam into an air valve itself of the type shown in FIG. 15 or of a damper or of another air flow control device or even of a section of duct work. FIG. 16 illustrates an example of how this is done with the fiber 22 coming most likely from some optical switch 50, 550 or 500, etc. Elements 1322 and 1323 are mirrored surfaces to create a multiple path such as is shown in the gas sensing cell of FIG. 7. After crisscrossing the duct one or more times the light from the fiber is reflected back into the fiber 22. Alternatively the light may only cross the duct once or multiple times but is picked up at the opposite side of the duct (not shown) and sent down the fiber 22 in a unidirectional system. To help with emitting and the collecting of the light, lens 1321 may be used to widen the emitted beam and narrow the collected beam to create a wider beam to cross the duct. One advantage of the approach shown in FIG. 16 is that it can be used to sense the average air velocity in the duct and thus also the air volume in the duct using laser velocimetry which uses the sensed Doppler shift of particles in the air to sense the velocity of the air itself.

FIG. 8 illustrates an optical switch such as the optical switch 550 shown in FIG. 6 connecting a bidirectional optical fiber 22 to a one port optical device such as the reflective gas sensing cell 700 shown in FIG. 7.

Figure 9:
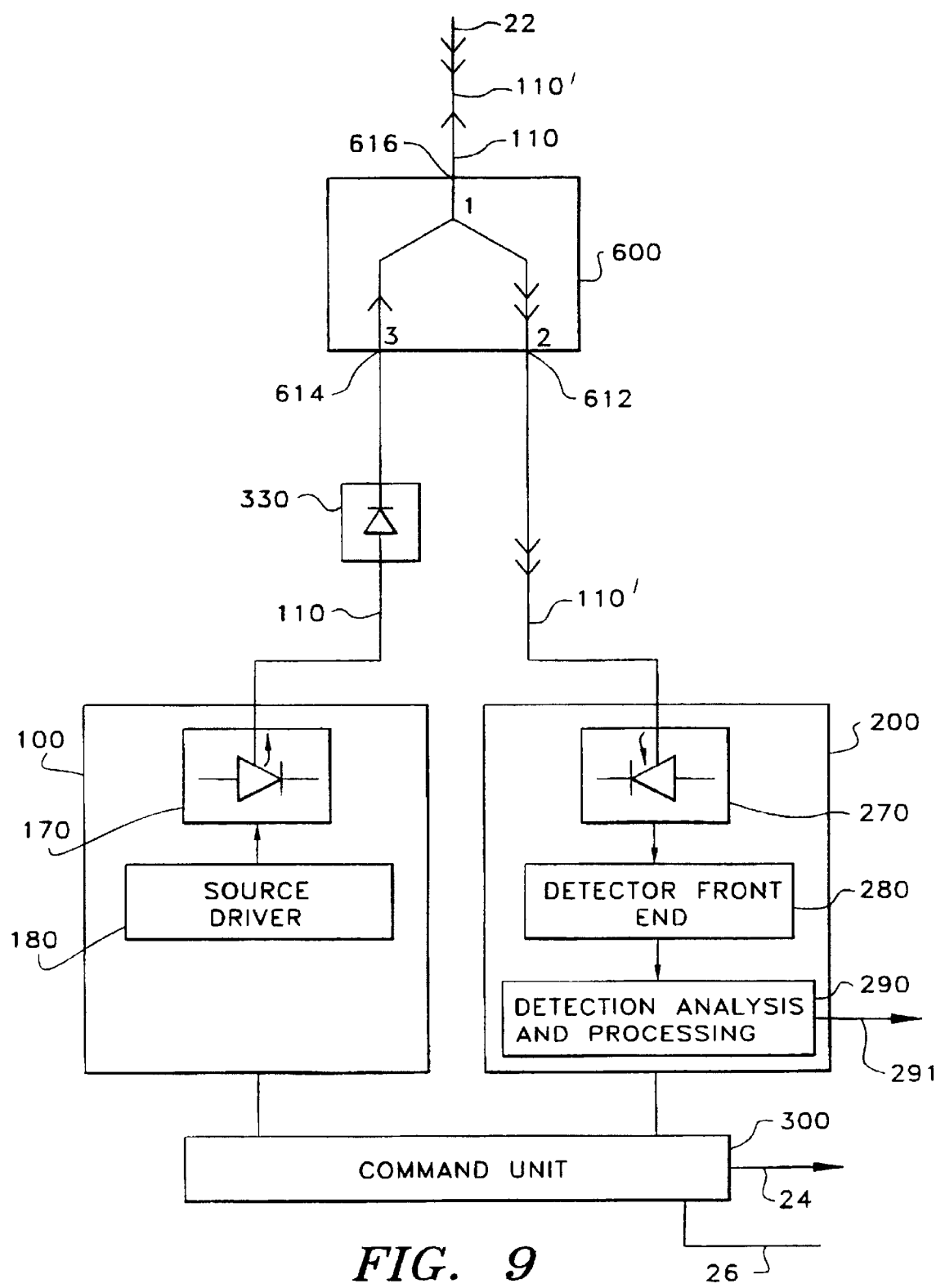
FIG. 9 illustrates a bidirectional optical circulator/coupler connecting a source of light, a detector system, and a command unit.

One approach to implementing a bidirectional version of the common source detection and command system 30 in FIG. 1 is shown in FIG. 9 which illustrates a bidirectional optical circulator 600 (or alternatively a 1X2 optical coupler could also be used instead) connected to a source of light 100, a detector system 200, and a command unit 300.

The optical fiber 22 of the optical distribution network 20 is coupled to the optical circulator 600 at port 1 616. The detector system 200 and the source of light 100 are coupled to the optical circulator 600 at port 2 612 and port 3 614 respectively. The source of light 100 and detector system 200 are coupled to a command unit 300 which controls their operation.

The light source 100 generates light 110 which is coupled to the optical fiber 22 of the optical distribution network 20 by the optical circulator 600. The light 100 is effected by an external condition proximate to some optical device coupled to the optical distribution network 20. The affected light 110' is coupled onto the optical fiber 22 and directed back to port 1 616 of the optical circulator 600. The optical circulator 600 directs the affected light 110' to the detector system 200 which detects the condition and provides outputs to the command unit 300. An alternate embodiment of FIG. 9 replaces the optical circulator 600 with a potentially cheaper 1X2 optical coupler to achieve the same result but with the disadvantage of some additional loss caused by the coupler.

The source of light 100 of FIG. 9 could include an LED or Laser diode or some other form of illumination 170 coupled to a driver circuit 180. The detector system 200 could include a photodiode detector or some other device 270 to measure the intensity of light coupled to a set of detector electronics 280 to refine the photodiode or other suitable detector's output in order to generate a meaningful output signal related to the received light intensity. This signal can then be processed by a CPU or special signal processor 290 to output a calibrated output signal 291 that is directly readable in some appropriate engineering units. Both the source system 100 and the detector system 200 are controlled and coordinated by the command unit 300. This command unit 300 also analyzes the operating parameters of the light source, the photonic signal distribution network, the pertinent optical devices and the received signals of the detector in order to generate a meaningful qualitative and/or quantitative measure of the level of environmental gas concentrations, biological agents, particles, temperature, humidity, pressure, displacement, air velocity, and proximity or location of objects including people which can affect the sensed parameter at the sensed location. This information can then be communicated to the operator by a graphical user interface or through a data communications interface connection 26 to another system such as a building control and management system (BMS) having its own Graphical User Interface or other means of communicating with a user or operator.

FIG. 10 illustrates a six port duplex optical switch 1000 connecting an optical device 60 and two optical fibers 22a, 22b operating in a duplex optical network (not shown). A duplex optical network is similar to the optical distribution network 20 shown in FIG. 1. except that it has two optical fibers. The duplex optical switch 1000 allows full duplex operation of the duplex optical distribution network, providing a feed optical fiber 22a and a return optical fiber 22b. Light 110 is provided by the feed optical fiber 22a to the input port 1010 of the duplex switch 1000. The light 110 can be switched by the duplex switch 1000 to the duplex optical distribution network and another duplex switch 1000, or to an optical device 60 as shown in FIG. 10. The light 110 is effected by optical device 60 and the affected light 110' is directed to the return optical fiber 22b to a previous duplex switch (not shown) where it continues to a detection system.

Another type of optical device 60 involves the use of optical fiber sensor structures. In these sensor approaches the light stays substantially in the fiber and is modified in some way by the specially designed fiber's interaction with it's surrounding environment. For example a porous type of cladding material can be used such that as the fiber cladding absorbs different materials such as water vapor or chemical vapors, the loss of the fiber is changed due to the change in the fiber cladding's index of refraction. Alternatively if the fiber is stretched or bent by environmental forces such as air velocity or pressure or displacement the fiber's loss can also be changed.

Alternatively, many various types of optical sensor devices and methods have and continue to be developed that modify light in some way based on environmental conditions. Examples of some of these devices include Michelson-type interferometric sensors, vibrating beam micro-machined sensors developed for example by Honeywell, fiber Bragg grating sensors, Fabry-Perot interferometric sensors, or the related in-line fiber Etalon (ILFE) sensors. Any of these devices could be put in the space to be sensed and then the processing circuitry can be multiplexed as described heretofore.

In another implementation of the invention, an optical device 60 can also include a another alternative form of smart optical fiber structure that involves coating the end of a fiber to be exposed to the environment with various special chemical or biological materials that are affected in some way by the environment. Specifically these sensors have specially designed surfaces or fiber ends that can detect pre-selected conditions such as gases, biological agents, and other airborne matter. One manner by which this can be implemented involves using a special light source 100 located in the remote unit 30 of for example FIG. 1 that sends this light down the fiber 22 and through the optical switches 50 to the optical sensor device 60 as described above. This light in the presence of the material to be sensed reacts together with the coated chemical in some way such as fluorescing. The changed or fluorescent light is then carried back down the same fiber or a duplex fiber path to an optical detector 200 which detects the amount of changed or perhaps fluorescent light. These devices are described in detail in Jane A. Ferguson and David R. Walt, Optical Fibers Make Sense of Chemicals, Photonics Spectra, March 1997; Eric Udd, Applications of Fiber Optic Smart Structures, ISBN# 0-7803-3277-6; and R. A. Lieberman, Distributed and Multiplexed Chemical Fiber Optical Sensors, SPIE Vol. 1586 (1991) which are incorporated herein by reference.

The preceding sensor strategies or other approaches may be combined to measure multiple parameters such as air velocity, temperature, pressure, multiple gases etc. at a given sensed location. Other parameters that could also be sensed include viable organisms such as microbial or bacteria infestations or fungus growth which may be detected for example, through the sensing of certain VOC's given off by these organisms.

If fiber sensors are used for example, multiple fiber segments may be used in series or in parallel in conjunction with two couplers (one acting as a beam splitter and the other to couple the different segments back to a common fiber). Alternatively, wavelength division or time division multiplexing can also be used at the site to multiplex multiple sensors in order to sense multiple parameters simultaneously. Alternatively, a 1XN Hub optical switch could also be used at the desired location to select one of a set of sensors.

From an application standpoint, many functions and sensed parameters can be performed simultaneously. For example, an optical device 60 could consist of a device to send a beam crisscrossing across a doorway before it is captured and sent back down the fiber network 20. This simple sensor approach could be simultaneously used to sense the concentrations of various gases in the air passing through the doorway, the velocity of air passing through the doorway, the presence of smoke in the environment through the obscuration of the light or else by sensing for the gaseous components of combustion, size and amount of airborne particles, and even security considerations by sensing for momentarily obstructions of the beam caused by someone passing through the doorway.

Similarly, a light beam could be sent in a one pass or multiple, crisscross path across the opening of a laboratory fume hood in order to simultaneously sense multiple parameters. For example, the amount of containment or similarly the amount of loss of containment could be measured by analyzing the gases that pass through the beams crossing the hood opening. Fume hood face velocity could also be measured as well the amount of particles in the air. Depending on how much coverage exist of the beams across the opening, the presence of a person reaching into the hood could also be detected. A direct measure of containment could also be measured by releasing a known amount of measurable, tracer gas in the hood with the light beams used to detect how much of the gas passes through the hood opening into the environment. Although less sensitive this measurement of the tracer gas could also be done in a general exhaust air stream as discussed above in FIG. 16 to look for larger loss of hood capture. Similar to above, a hood or lab fire could be detected by measurement of the smoke gases and particles passing through the light beams of a hood opening or of a general exhaust valve Data Communication and Control Appropriate communication and signal processing techniques are employed in the invention to ensure coordination of the source and the detected light signals as well as that the proper switches are actuated and that the desired affected light signals from the sensed locations are properly detected and identified.

The command unit 300 coordinates the operation of the remotely distributed switches 50 (or other optical switches 500, 510, 520, 550, etc.) associated with the photonic signal distribution system 10. The command unit 300 generates preselected data signals that command the remotely distributed switches 50 to operate as required. The remotely distributed switches 50 can be controlled directly or by means of a plurality of data communication and control devices 310. By directly, it is meant control cables that are directly connected in a point to point connection between command unit 300 and the respective optical switch 50. A separate cable would be used per optical switch thereby creating a mass of cables emanating from the command unit 300 to all the respective optical switches 50.

Another control approach for the optical switches 50, would involve either minimal or no control via the command unit 300 or just some form of simple synchronizing of the optical switches in which they are self controlled or operated through a preset sequence. For example, upon power up the optical switches could operate in some form of preprogrammed sequence where each switch in turn switches on to route its affected light 110' back to the detector 200. A unique code such as a varying switch on time could be assigned to each switch so that the command unit 300 could determine where the light signal 110' came from without need to control or even synchronize the optical switches' operation.

A potentially more powerful and more flexible approach uses the data communication and control devices 310 that are connected together in some form of electrical wire, wireless (RF), power line carrier, or optical fiber data communications network with each other and command unit 300. The data communication and control devices 310 are in turn directly connected (or potentially connected through some form of other data communications network) with the remotely distributed switches 50 for controlling their operation in response to the preselected data signals that originate from the command unit 300 or potentially from another data communication and control device 310. The communication and control devices 310 can be proximate to or incorporated into the remotely distributed switches 50. In addition, the number of communication and control devices 310 can be equal to or not the same as the number of remotely distributed switches 50. For example, the data communication and control devices 310 may control more than one of the optical switches 50.

The data communication and control devices 310 may include non-dedicated modules or software which perform functions in addition to operating the optical switches 50. For example, the non-dedicated modules or software can perform functions such as controlling devices unrelated to the networked photonic signal distribution system 10 such as, but not limited to, laboratory fume hood controls, room pressurization controls, room temperature controls, or be part of the building control and management systems. Alternatively, the data communication and control devices 310 may be part of a local area network of distributed Personal Computers (PCs) or computer workstation that are connected together in a data communications network. The data and communication control devices 310 could be separate devices in this local area network or be incorporated into the functions of the PCs or computer workstation themselves.

In another implementation of the present invention, the preselected data signals are generated by the command unit 300 and communicated to the data communication and control devices 310 over the same optical fiber 22 of the optical distribution network 20. The preselected data signals are generated in electrical or optical format by the command unit 300 and provided to the light source 100 which encodes the preselected data signals within the light 110 that is sent out onto the optical fiber 22. The preselected data signals in optical form can be at a wavelength different from the wavelengths of the light distributed by the optical distribution network. The light distributed by the optical distribution network itself can also be used to create the preselected data signals in optical form.

For example the light emitted by the source 100 for purposes of environmental monitoring could be preceded by a rapid set of short pulses or a digital word comprised of short and long pulses or through the length of the pulse could be used to address and divert the beam to a desired location by having a specific "address" for each location. The amount of time to sense at the location could be preprogrammed or could also be commanded though a second digital word transmitted after the address. For example two pulses could be transmitted the first is of a length that indicates the particular address, the other indicates the length of the sensing period. After the signaling is completed the optical source beam would then be used to sense the air at the indicated location. Multiple locations in a unidirectional series or ring based implementation could be simultaneously sampled with this approach as well by having certain address groupings that would turn on more than one switch.

Figure 12:
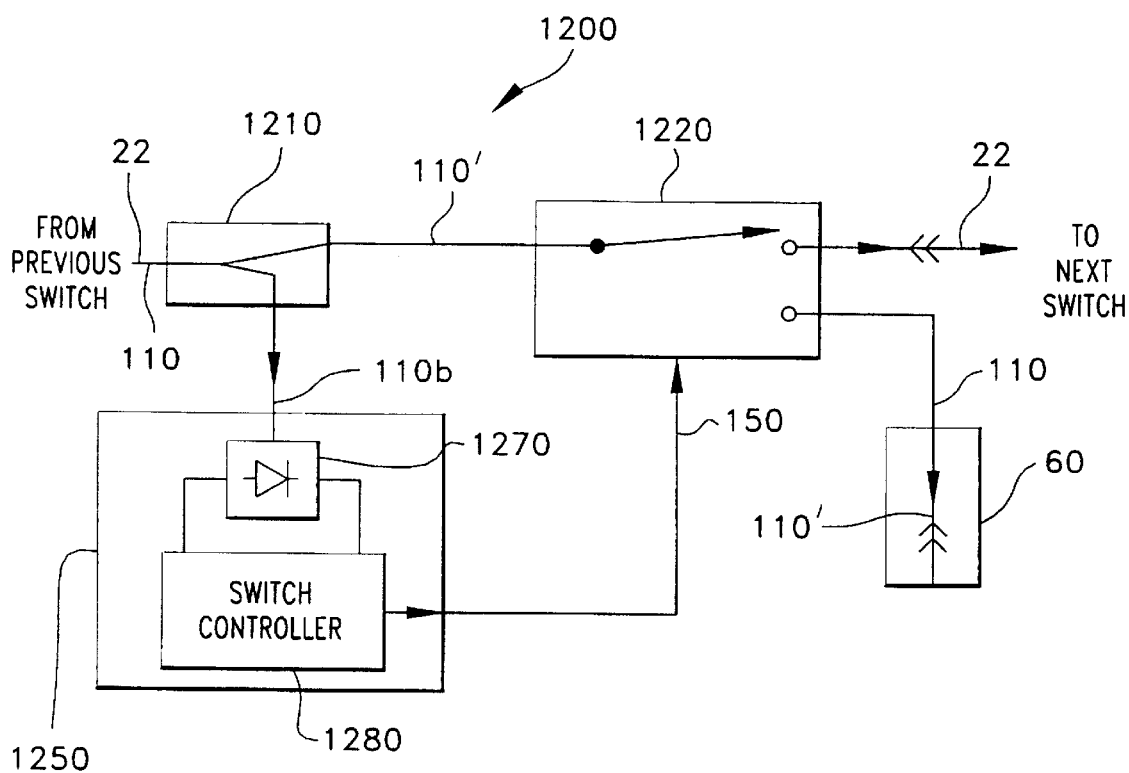
FIG. 12 illustrates an optically controlled switch system having a coupler, a switch controller, and an optical switch providing a through path to another switch and an optical device.

The above approach could be implemented through an approach shown in FIG. 12 which illustrates an optically controlled switch system 1200 that operates the optical switches without need for a separate data communications network 24 or data communications units 310. This system contains a coupler 1210, a switch controller 1250, and an optical switch 1220 providing a through path to another switch (not shown) and an optical device 60. The coupler 1210 may be a high ratio coupler tap such as the JDS FITEL AC0199 Coupler which is a 1/99 ratio monitor coupler specifically designed for tap or monitoring applications. The switch controller 1250 is coupled to the light 110 having a control signal 110b embedded in the light 110. The switch controller 1250 is controlled by the light control signal 110b which is typically generated by the command unit 300. A photo-detector of some type 1270 detects the light signal 110b and sends the corresponding electrical information to the switch controller element itself 1280. The switch controller 1250 controls the optical switch 1220 through it's control line input 150. When activated by this control line 150 the optical switch 1220 couples the light 110 to the optical device 60 where it is effected by the ambient condition. The affected light 110' is than coupled back through the optical switch 1220 and onto the optical distribution network 20 by means of the optical fiber 22.

In another example the light beam 110 itself could trigger the operation of successive switches operating in a bus configuration such as shown in FIG. 1 and FIG. 12. As each optical switch 1220 such as those shown in is in turn hit by entering light 110, it detects or is energized by that light 110 through switch controller 1250 to operate by switching on to route the light 110 to the optical device 60 and then to send the affected light 110' back to the optical detector 200. Switch controller 1250 then further acts after a preset period of time to switch the optical switch 1220 to bypass the light 110 to the next optical switch 1220 in the series configuration of the bus network structure to repeat the same sequence of operation with the next optical switch 1220 and optical device 60. In another aspect of the present invention, a plurality of independent networked photonic signal distribution system 10 can be linked together. This feature provides greater network flexibility and allows such things as larger network schemes, specialized networks for monitoring particular conditions, and improved system performance and accuracy by reducing or shifting the load on any one command unit 300, light source 100, or detection unit 200. In addition, the command units 300 and data and communication control devices 310 described above can include a programmable device such as a computer.

Wavelength-division Multiplexing (WDM)

In another aspect of the invention, the networked photonic signal distribution system 10 may include communication and signal processing techniques such as, but not limited to, wavelength-division multiplexing (WDM). This technique provides expanded use of system bandwidth by allowing for signal discrimination as a function of wavelength. WDM is more fully described in Alan Eli Willner, Mining the Optical Bandwidth for a Terabit per second, IEEE Spectrum, April 1997 and Alan D. Kersey, Multiplexed Fiber Optic Sensors, SPIE Vol. 1797 (1992) which are incorporated herein by reference.

Very briefly in summary, this approach involves transmitting data on many different wavelengths. Multiple signals with even small wavelength differences on the order of even 5 to 10 nanometers can be used to separate data streams. These streams can then be routed to different locations by star type routers or hubs where a variety of techniques can be used to effectively demultiplex the signal and split out the different signals if desired onto different outputs of the router based on the wavelength of the signal. This demultiplexing can be done by many techniques such as interference filters, or GRIN-rod lenses. An example of a commercial product that involves cascaded interference filters is the WD5555 E/W product series manufactured by JDS Fitel.

Figure 13:
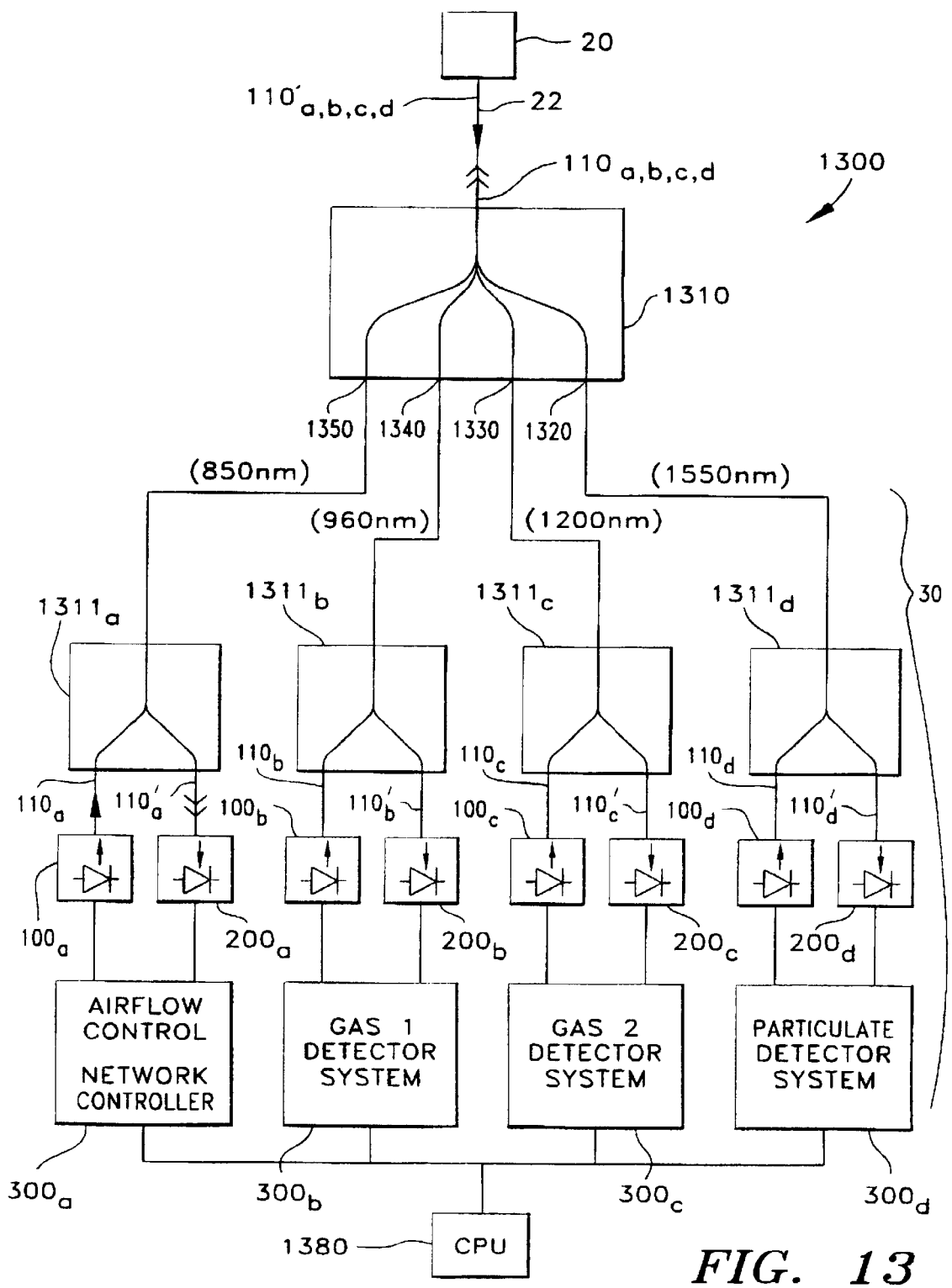
FIG. 13 illustrates common source, detection, and command units having multiple detectors, sources, and a network command unit which communicate over the same fiber path and have a wavelength division multiplex configuration.

For example, the networked photonic signal distribution system 10 can have a source of light 100 that generates light 110 having a plurality of wavelengths as shown in FIG. 13. This figure illustrates a plurality of common source detection and command system 30 in a wavelength division multiplex configuration 1300. The wavelength division multiplex configuration 1300 includes a bidirectional dense wavelength division multiplexer 1310 such as, but not limited to, a JDS Fitel WD5555B. A plurality of wavelengths are preselected, such as 850 nm, 960 mn, 1200 nm and 1550 nm, that are used throughout a photonic signal distribution system 20. The ports 1320, 1330, 1340, 1350 of the wavelength division multiplexer 1310 are coupled to a plurality of bidirectional circulators or couplers 1311*a,b,c,d* respectively. The plurality of circulators or couplers 1311*a,b,c,d* couples light 110*a,b,c,d* produced by a plurality of light sources 100*a,b,c,d* to the photonic signal distribution system 20 where it is effected by a plurality of optical devices (not shown). The affected light 110'*a,b,c,d* is returned to the wavelength division multiplexer 1310 and separated by wavelength and coupled by ports 1320, 1330, 1340, 1350 to the plurality of circulators or couplers 1311*a,b,c,d*. The affected light 110'*a,b,c,d* is provided to a plurality of detector systems 200*a,b,c,d* where it is detected and analyzed by a plurality of command units 300*a,b,c,d*. The operation of the command units 300*a,b,c,d* may be further controlled by a CPU 1380.

It will be appreciated that the present invention provides a highly flexible, highly adaptable signal distribution system which enables rapid detection of and response to environmental conditions. In addition, the invention's networked nature greatly reduces complexity and cost of environmental detection and control systems. These and other advantages of the present invention will be apparent to those skilled in the art from the foregoing specification.

The present invention may be embodied in other specific forms without departing from the spirit or essential attributes thereof and, accordingly, reference should be made to the appended claims, rather than to the foregoing specification, as indicating the scope of the invention.

What is claimed is:

1. A networked photonic signal distribution system comprising:

a source of light, a light detector, an optical distribution network for distributing light from the source of light to the detector along a preselected optical path, a first plurality of remotely distributed optical devices in optical communication with the optical distribution network for receiving light therefrom, said optical devices being responsive to an external condition, said external condition affecting a parameter of said light, and a second plurality of remotely distributed switches responsive to electric signals for selectably connecting said optical devices to said optical distribution network for receiving light from said source of light and conveying light affected by said external condition to said optical distribution network for conveying said affected light to said detector, said detector generating output signals in response to said affected light, and a processor responsive to said detector output signals for generating outputs representative of said external condition.

2. The networked photonic signal distribution system as in claim 1 wherein the optical distribution network forms a ring network structure.

3. The networked photonic signal distribution system as in claim 1 wherein the network forms a bus structure.

4. The networked photonic signal distribution system as in claim 1, 2, or 3 wherein the optical distribution network carries light in a bi-directional manner.

5. The networked photonic signal distribution system as in claim 1, 2, or 3 wherein the optical distribution network carries light in a uni-directional manner.

6. The networked photonic signal distribution system as in claim 1 wherein the optical distribution network includes an optical fiber.

7. The networked photonic signal distribution system as in claim 1 wherein said external condition is selected from the group consisting of containment of a laboratory hood, gas, particulate, quality of air in a building.

8. The networked photonic signal distribution system as in claim 1 wherein said source of light comprises a single source located at an input to the optical distribution network for generating all of the light conveyed by the optical distribution network.

9. The networked photonic signal distribution system as in claim 1 wherein said remotely distributed switches are electro-optical switches.

10. The networked photonic signal distribution system as in claim 1 wherein said light detector comprises a single detection device at an output of said optical distribution network.

11. The networked photonic signal distribution system as in claim 1 wherein said plurality of remotely distributed optical devices are integrated with an airflow control device for sensing airflow passing through the airflow control device.

12. The networked photonic signal distribution system as in claim 1 wherein said first and second plurality are equal in number.

13. The networked photonic signal distribution system as in claim 1 wherein the source of light generates a plurality of wavelengths.

14. The networked photonic signal distribution system as in claim 1 wherein the said plurality of remotely distributed optical devices comprises a number of different devices for responding to different external conditions.

15. The networked photonic signal distribution system as in claim 1 wherein at least one of the plurality of optical devices responds to a plurality of external conditions.

16. The networked photonic signal distribution system as in claim 1 wherein the optical distribution network has a plurality of optical paths coupled into a routing device.

17. The networked photonic signal distribution system as in claim 16 wherein the routing device comprises a coupler.

18. The networked photonic signal distribution system as in claim 17 wherein the routing device comprises a switch.

19. The networked photonic signal distribution system as in claim 1 wherein the optical distribution network forms a tree network structure.

20. The networked photonic signal distribution system as in claim 1 wherein the optical fiber further comprises at least one optical amplifier.

21. The networked photonic signal distribution system as in claim 20 wherein said optical amplifier is an erbium-doped optical-fiber amplifier.

22. The networked photonic signal distribution system as in claim 20 wherein said at least one optical amplifier has two unidirectional optical amplifiers.

23. The networked photonic signal distribution system as in claim 1 further comprising,
a third plurality of remotely distributed data communication and control devices in communication with said switches for controlling the operation thereof in response to preselected data signals, and
a command unit for coordinating the operation of the data communication and control devices in a preselected manner.

24. The networked photonic signal distribution system as in claim 23 where in the third plurality is equal in number to said second plurality.

25. The networked photonic signal distribution system as in claim 23 wherein the preselected data signals are in electrical form.

26. The networked photonic signal distribution system as in claim 23 wherein the command unit comprises a preselected one of said third plurality of data communication and control devices.

27. The networked photonic signal distribution system as in claim 23 wherein the data and communication control devices comprise non-dedicated modules, said modules performing functions in addition to operating said optical switches.

28. The networked photonic signal distribution system as in claim 27 wherein the data and communication control devices control the ventilation system in a building.

29. The networked photonic signal distribution system as in claim 23 wherein the command unit comprises a programmable device.

30. The networked photonic signal distribution system as in claim 29 wherein the programmable device comprises a computer.

31. The networked photonic signal distribution system as in claim 23 wherein the preselected data signals are in optical form.

32. The networked photonic signal distribution system as in claim 31 wherein the preselected data signals in optical form are conveyed along said optical distribution network.

33. The networked photonic signal distribution system as in claim 32 wherein the preselected data signals in optical form are at a wavelength different from the wavelengths of the light distributed by the optical distribution network.

34. The networked photonic signal distribution system as in claim as in claim 32 wherein the light distributed by the optical distribution network is used to create said preselected data signals in optical form.

35. The networked photonic signal distribution system as in claim 23 wherein said data communication and control devices receive radio frequency signals for wireless operation.

36. The networked photonic signal distribution system as in claim 1 wherein said plurality of remotely distributed optical devices generate a light beam across a portion of an area to be sensed.

37. The networked photonic signal distribution system as in claim 36 wherein the area to be sensed is in an air duct.

38. The networked photonic signal distribution system as in claim 1 wherein said plurality of remotely distributed optical devices include an averaging chamber where air is sampled as it is drawn through the averaging chamber.

39. The networked photonic signal distribution system as in claim 38 wherein a pressure drop across an airflow control device is used to draw air through the averaging chamber.

40. The networked photonic signal distribution system as in claim 1 wherein said plurality of remotely distributed optical devices include a section of optical fiber responsive to an external condition.

41. The networked photonic signal distribution system as in claim 1 wherein a portion of said plurality of remotely distributed switches are replaced by optical couplers.

42. The networked photonic signal distribution system as in claim 1 wherein said source of light is a laser diode having a variable wavelength.

43. The networked photonic signal distribution system as in claim 1 wherein said source of light is a vertical cavity surface emitting diode.

44. The networked photonic signal distribution system as in claim 1 wherein said output signal is used to improve the environment in a building.

45. The networked photonic signal distribution system as in claim 1 wherein said output signal is used to control an industrial or manufacturing process.

46. The networked photonic signal distribution system as in claim 1 wherein said output signal is used to indicate the environment in a plurality of residential housing units.

47. The networked photonic signal distribution system as in claim 1 wherein said plurality of remotely distributed optical devices have a reflective element for use in a bidirectional network.

48. The networked photonic signal distribution system as in claim 1 wherein multiple areas are simultaneously monitored.

49. The networked photonic signal distribution system as in claim 48 wherein at least two of said switches are energized simultaneously.

50. The networked photonic signal distribution system as in claim 1 wherein the network comprises combinations of bus and tree structures.

51. The networked photonic signal distribution system as in claim 1 wherein said source of light include pulsed light signals.

52. A networked photonic signal distribution system for measuring at least one external condition in at least one space, the system comprising:
   a source of light,
   a light detector,
   an optical distribution network for distributing light from the source of light to the detector along a preselected optical path, said optical path extending into at least one space,
   a first plurality of remotely distributed optical devices in optical communication with the optical distribution network for receiving light therefrom, said optical devices being responsive to at least one external condition, said at least one external condition affecting a parameter of said light, and
   a second plurality of remotely distributed switches responsive to electrical signals for selectable connecting said optical devices to said optical distribution network for receiving light from said source of light and conveying light affected by said at least one external condition to said optical distribution network for conveying said affected light to said detector,
   said detector generating output signals in response to said affected light, and a processor responsive to said detector output signals for generating outputs representative of said at least one external condition.

53. The networked photonic signal distribution system as in claim 52 wherein said at least one space is at least one building.

54. The networked photonic signal distribution system as in claim 52 wherein said at least one space is at least one preselected area in at least one building.

55. A networked photonic signal distribution system comprising:
   a light source means,
   a light detector means,
   an optical distribution network means for distributing light from the light source means to the detector means along a preselected optical path,
   a first plurality of remotely distributed optical device means in optical communication with the optical distribution network means for receiving light therefrom, said optical device means being responsive to an external condition, said external condition affecting a parameter of said light, and
   a second plurality of remotely distributed switch means responsive to electrical signals for selectably connecting said optical device means to said optical distribution network means for receiving light from said light source means and conveying light affected by said external condition to said optical distribution network means for conveying said affected light to said detector means,
   said detector means generating output signals in response to said affected light, and a processor means responsive to said detector output signals for generating outputs representative of said external condition.

56. A method of distributing a photonic signal in a networked distribution system comprising the steps of:
   generating light,
   distributing the light through an optical distribution network along a preselected optical path,
   receiving the light by a first plurality of remotely distributed optical devices in optical communication with the optical distribution network, the optical devices being responsive to an external condition,
   affecting a parameter of the received light when the optical device is responsive to the external condition,
   connecting, in a selectable manner, a second plurality of remotely distributed electrically actuated switches that connect the optical devices to the optical distribution network,
   conveying the light affected by the external condition on the optical distribution network to a light detector,
   detecting the affected light and generating output signals in response to said affected light, and
   processing the output signal with a processor to generate outputs representative of the external condition.

57. A networked photonic signal distribution system comprising:
   a source of light,
   a light detector,
   an optical distribution network for distributing light from the source of light to the detector along a preselected optical path,
   a first plurality of remotely distributed optical devices in optical communication with the optical distribution network for receiving light therefrom, said optical devices being responsive to an external condition, said external condition affecting a parameter of said light, and
   a second plurality of remotely distributed electro-optical switches for connecting said optical devices to said optical distribution network for receiving light from said source of light and conveying light affected by said external condition to said optical distribution network for conveying said affected light to said detector,
   said detector generating output signals in response to said affected light, and a processor responsive to said detector output signals for generating outputs representative of said external condition.

58. The networked photonic signal distribution system as in claim 57 wherein said remotely distributed electro-optical switches are controlled by electrical signals derived from the light distributed by the optical distribution network.

59. A networked photonic signal distribution system comprising:
   a source of light,
   a light detector,
   an optical distribution network for distributing light from the source of light to the detector along a preselected optical path,
   a first plurality of remotely distributed optical devices in optical communication with the optical distribution network for receiving light therefrom, said optical devices being responsive to an external condition, said external condition affecting a parameter of said light, a second plurality of remotely distributed switches for selectably connecting said optical devices to said optical distribution network for receiving light from said source of light and conveying light affected by said external condition to said optical distribution network for conveying said affected light to said detector, a third plurality of remotely distributed data communication and control devices in communication with said switches for controlling the operation thereof in response to preselected electrical data signals, and a command unit for coordinating the operation of the data communication and control devices in a preselected manner, said detector generating output signals in response to said affected light, and a processor responsive to said detector output signals for generating outputs representative of said external condition.

60. A networked photonic signal distribution system comprising:

a source of light, a light detector, an optical distribution network for distributing light from the source of light to the detector along a preselected optical path, a first plurality of remotely distributed optical devices in optical communication with the optical distribution network for receiving light therefrom, said optical devices being responsive to an external condition, said external condition affecting a parameter of said light, a second plurality of remotely distributed switches for selectable connecting said optical devices to said optical distribution network for receiving light from said source of light and conveying light affected by said external condition to said optical distribution network for conveying said affected light to said detector, a third plurality of remotely distributed data communication and control devices in communication with said switches for controlling the operation thereof in response to preselected electrical data signals, an electrical network in communication with said third plurality of remotely distributed data communication and control devices for communicating said preselected data signals, and a command unit for coordinating the operation of the data communication and control devices in a preselected manner, said detector generating output signals in response to said affected light, and a processor responsive to said detector output signals for generating outputs representative of said external condition.

* * * * *